US009821694B2

(12) United States Patent
McMillen et al.

(10) Patent No.: US 9,821,694 B2
(45) Date of Patent: Nov. 21, 2017

(54) SEAT WITH PNEUMATIC HEADREST AND THIGH ADJUSTMENT

(71) Applicant: Leggett & Platt Canada Co., Halifax (CA)

(72) Inventors: Robert J. McMillen, Tecumseh (CA); Renato Colja, Windsor (CA)

(73) Assignee: Leggett & Platt Canada Co., Halifax, Nova Scotia (CA)

( * ) Notice: Subject to any disclaimer, the term of this patent is extended or adjusted under 35 U.S.C. 154(b) by 101 days.

(21) Appl. No.: 14/805,697

(22) Filed: Jul. 22, 2015

(65) Prior Publication Data

US 2015/0321588 A1    Nov. 12, 2015

Related U.S. Application Data

(63) Continuation of application No. 13/831,017, filed on Mar. 14, 2013, now Pat. No. 9,090,185.

(51) Int. Cl.
*B60N 2/02*    (2006.01)
*B60N 2/48*    (2006.01)
(Continued)

(52) U.S. Cl.
CPC .............. *B60N 2/4852* (2013.01); *B60N 2/02* (2013.01); *B60N 2/0284* (2013.01); (Continued)

(58) Field of Classification Search
CPC ....... B60N 2/4838; B60N 2/4805; B60N 2/02
(Continued)

(56) References Cited

U.S. PATENT DOCUMENTS 4,707,027 A    11/1987  Horvath et al.
4,720,146 A *   1/1988  Mawbey ............. B60N 2/4415
                                                    297/284.6
(Continued)

FOREIGN PATENT DOCUMENTS

DE      10318928 A1    11/2004
DE    102011112809 A1    3/2013
EP       1077154 A2     2/2001

OTHER PUBLICATIONS

International Search Report and Written Opinion of the International Searching Authority, International Patent Application No. PCT/CA2014/000185, dated May 28, 2014.
(Continued)

*Primary Examiner* — Syed A Islam
(74) *Attorney, Agent, or Firm* — Michael Best & Friedrich LLP

(57) ABSTRACT

A pneumatically adjustable seat includes a seat frame having a seat back frame portion and a headrest coupled to the seat back frame portion. The headrest includes a resilient cushion. A drive assembly includes a contact member operatively associated with the resilient cushion. A first bladder is operatively coupled to the contact member and in fluid communication with a source of pressurized fluid. Inflation of the first bladder via the source of pressurized fluid extends the contact member from a first position nearer the seat back frame to a second position further from the seat back frame. A second bladder is operatively coupled to the contact member and in fluid communication with the source of pressurized fluid. Inflation of the second bladder via the source of pressurized fluid pivots the contact member away from an occupant of the seat.

31 Claims, 22 Drawing Sheets

(51) Int. Cl.
  *B60N 2/62* (2006.01)
  *B60N 2/44* (2006.01)
(52) U.S. Cl.
  CPC ......... *B60N 2/4415* (2013.01); *B60N 2/4805* (2013.01); *B60N 2/4808* (2013.01); *B60N 2/4829* (2013.01); *B60N 2/4838* (2013.01); *B60N 2/62* (2013.01)
(58) Field of Classification Search
  USPC ......... 297/408, 216.12, 410, 284.12, 452.41, 297/452.18, DIG. 3
  See application file for complete search history.

(56) References Cited

U.S. PATENT DOCUMENTS

| | | | |
|---|---|---|---|
| 5,082,326 A * | 1/1992 | Sekido | B60N 2/4415 297/284.6 |
| 5,529,377 A | 6/1996 | Miller | |
| 6,088,643 A | 7/2000 | Long et al. | |
| 6,203,105 B1 | 3/2001 | Rhodes, Jr. | |
| 7,048,337 B2 | 5/2006 | Steinle et al. | |
| 7,185,950 B2 | 3/2007 | Pettersson et al. | |
| 8,456,745 B2 | 6/2013 | Weissman | |
| 8,459,745 B2 | 6/2013 | Wahlers et al. | |
| 2007/0145803 A1 | 6/2007 | Kopetzky et al. | |
| 2011/0101738 A1 | 5/2011 | Jensen | |

OTHER PUBLICATIONS

Chinese Patent Office Action for Application No. 201410096267.5 with English Translation dated Apr. 12, 2017 (24 pages).

\* cited by examiner

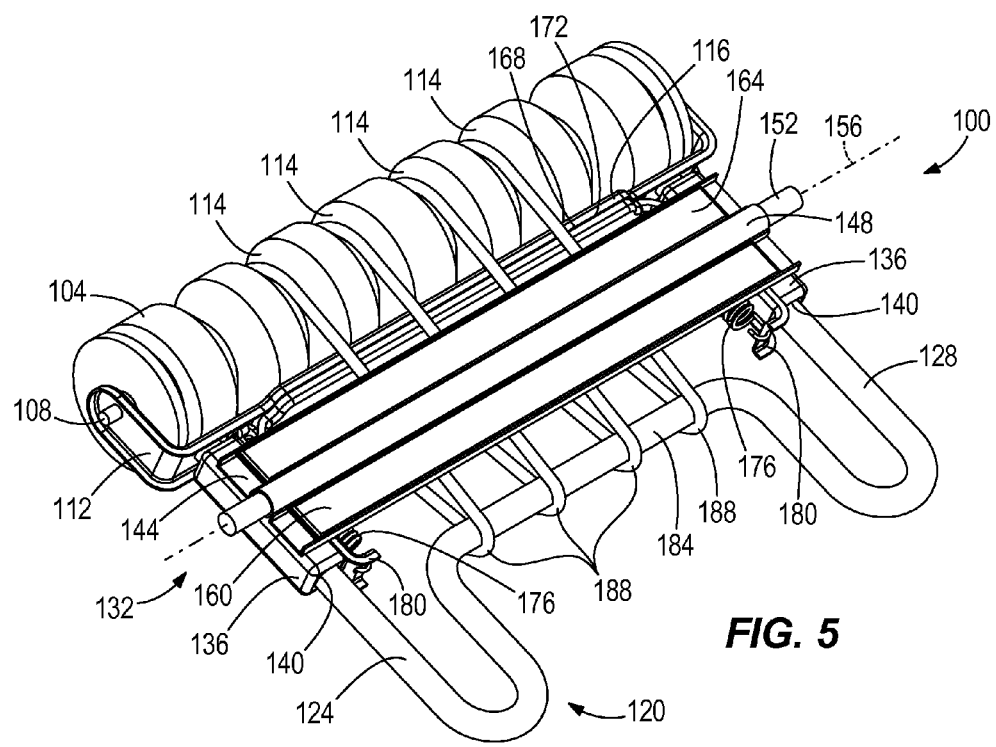
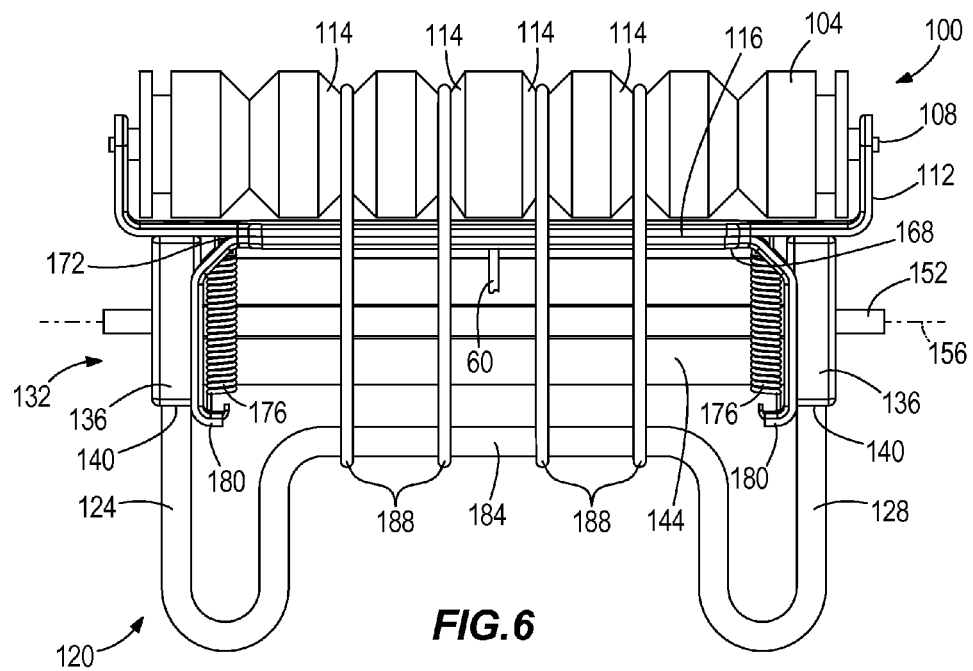

SEAT WITH PNEUMATIC HEADREST AND THIGH ADJUSTMENT

BACKGROUND

The present invention relates to seats with adjustable cushions to support an occupant's head and thighs.

Seat adjustability is a desirable feature in vehicles in order to adequately accommodate a wide range of occupants with the same general seat configuration. Conventional adjustable seats utilize individual mechanical actuator units for each adjustable component. Increasing the adjustability of the seat therefore requires additional actuators, adding weight, complexity, and cost.

SUMMARY

In one embodiment of a pneumatically adjustable seat, the seat includes a seat frame having a seat back frame portion and a headrest coupled to the seat back frame portion. The headrest includes a resilient cushion. A drive assembly includes a contact member operatively associated with the resilient cushion. A bladder is operatively coupled to the contact member and in fluid communication with a source of pressurized fluid. Inflation of the bladder via the source of pressurized fluid moves the contact member from a first position to a second position.

In one embodiment of a pneumatically adjustable seat, the seat includes a seat frame having a seat cushion frame portion and a cushion extension portion coupled to the seat cushion frame portion. The cushion extension portion includes a resilient cushion. A drive assembly includes a contact member operatively associated with the resilient cushion. A bladder is operatively coupled to the contact member and in fluid communication with a source of pressurized fluid. Inflation of the bladder via the source of pressurized fluid moves the contact member from a first position to a second position.

In one embodiment of a pneumatically adjustable seat, the seat includes a seat frame having a seat back frame portion and a headrest coupled to the seat back frame portion. The headrest includes a resilient cushion. A drive assembly includes a contact member operatively associated with the resilient cushion. A first bladder is operatively coupled to the contact member and in fluid communication with a source of pressurized fluid. Inflation of the first bladder via the source of pressurized fluid extends the contact member from a first position nearer the seat back frame to a second position further from the seat back frame. A second bladder is operatively coupled to the contact member and in fluid communication with the source of pressurized fluid. Inflation of the second bladder via the source of pressurized fluid pivots the contact member away from an occupant of the seat.

In a method of adjusting a seat frame having a seat back frame portion and a seat cushion frame portion, in which a headrest is coupled to the seat back frame portion and includes a resilient headrest cushion, and in which a cushion extension portion is coupled to the seat cushion frame portion and includes a resilient seat cushion, the method includes pressurizing a fluid with a pump, distributing pressurized fluid to a first bladder operatively associated with the resilient headrest cushion, and distributing pressurized fluid to a second bladder operatively associated with the resilient seat cushion. The method also includes inflating the first bladder to extend the headrest cushion from a first position to a second position and inflating the second bladder to extend the seat cushion from a first position to a second position.

Other aspects of the invention will become apparent by consideration of the detailed description and accompanying drawings.

BRIEF DESCRIPTION OF THE DRAWINGS

FIG. 5 is a perspective view of a drive assembly in a retracted, first position.

FIG. 6 is a front view of the drive assembly of FIG. 5.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
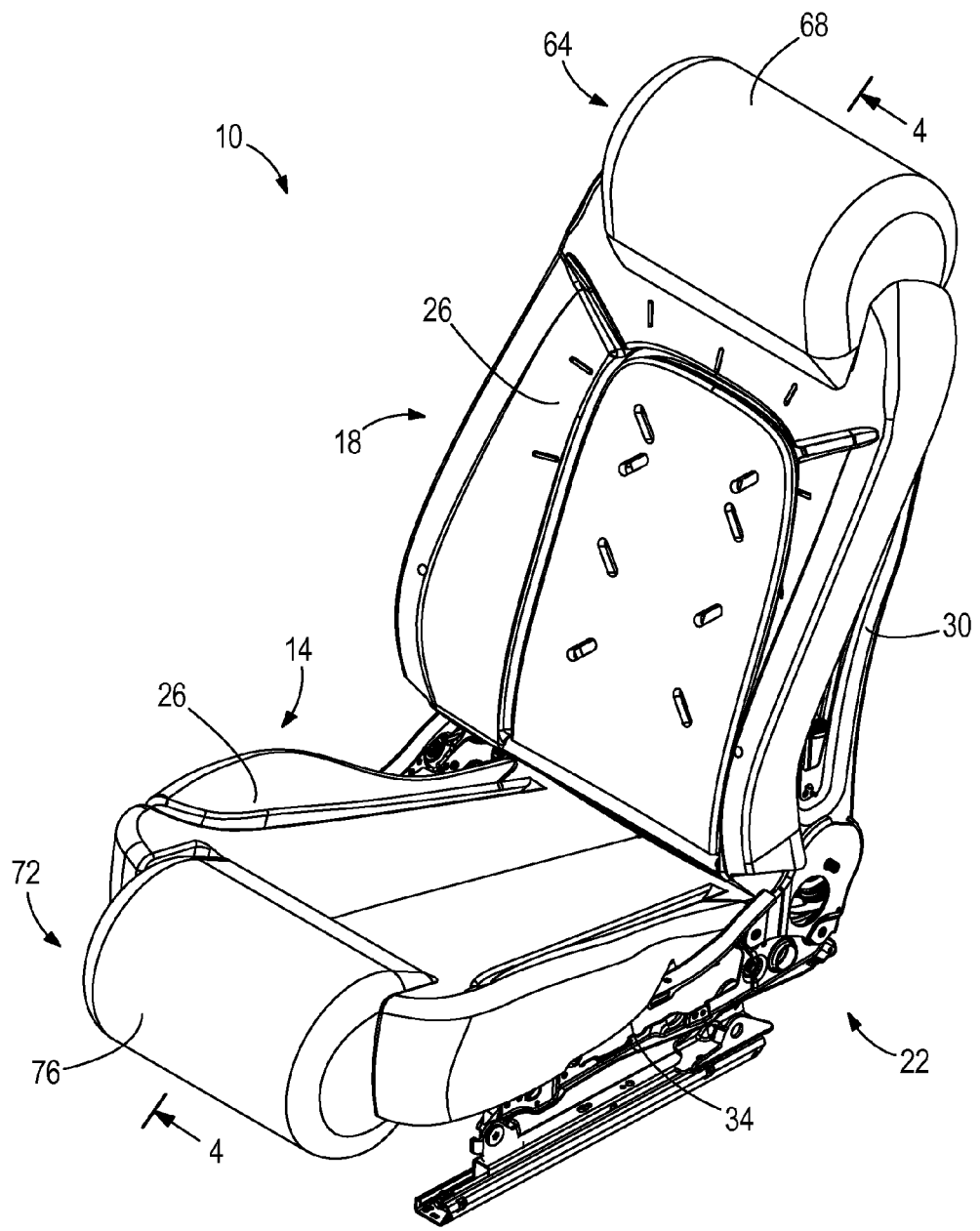
FIG. 1 is a front perspective view of an adjustable seat including a head rest and thigh support.
Figure 2:
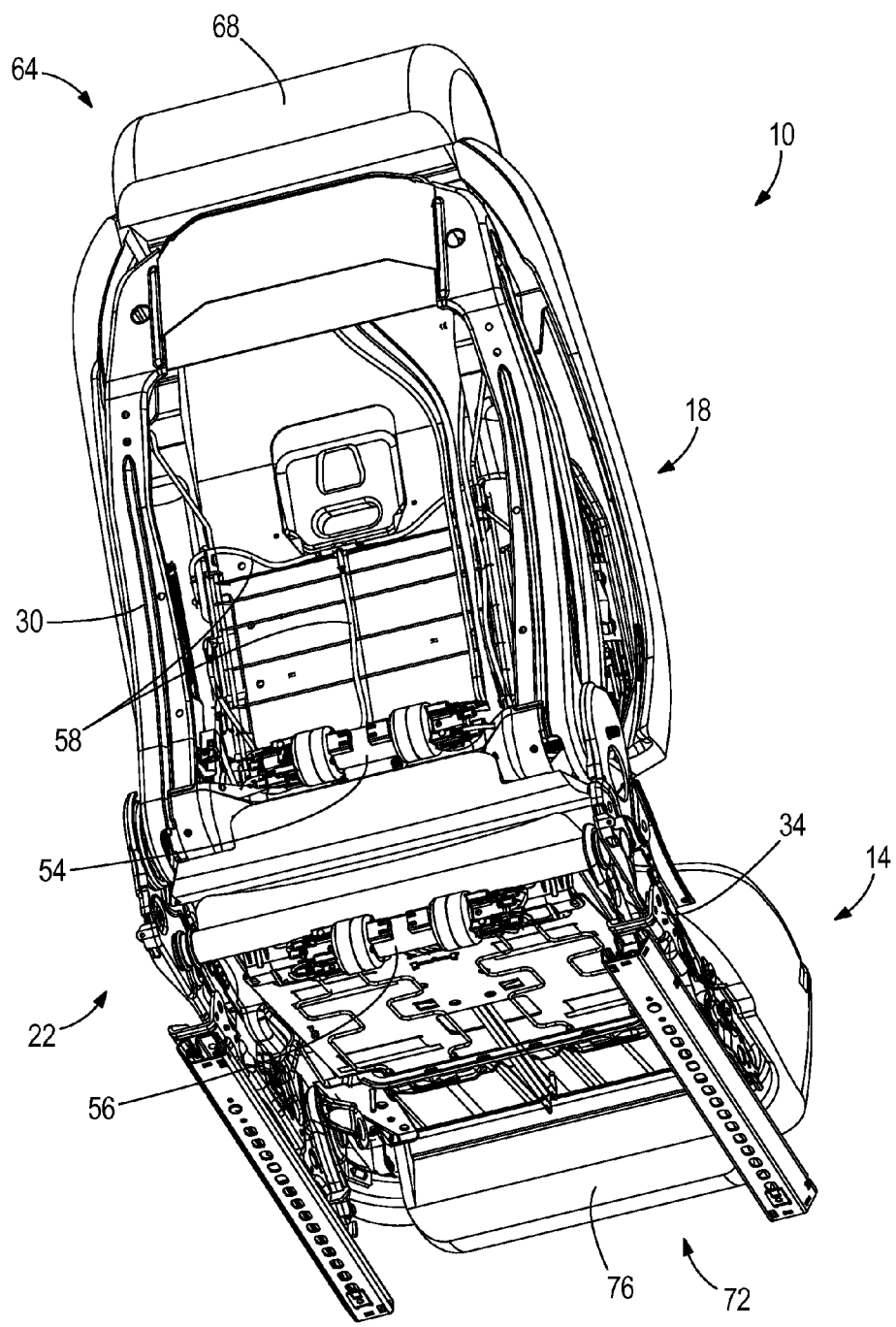
FIG. 2 is a rear perspective view of the adjustable seat of FIG. 1.

Referring to FIGS. 1 and 2, a seat 10 generally includes a seat bottom 14 and a seat backrest 18 for horizontal and vertical support, respectively, of a seat occupant. A frame 22, which is covered by overlying cushions 26, provides structural integrity for the seat 10 and includes a seat back frame portion 30 and a seat bottom frame portion 34. The seat 10 will be described herein as a vehicle seat within the passenger compartment of a vehicle but is not limited to vehicular applications.

Figure 3:
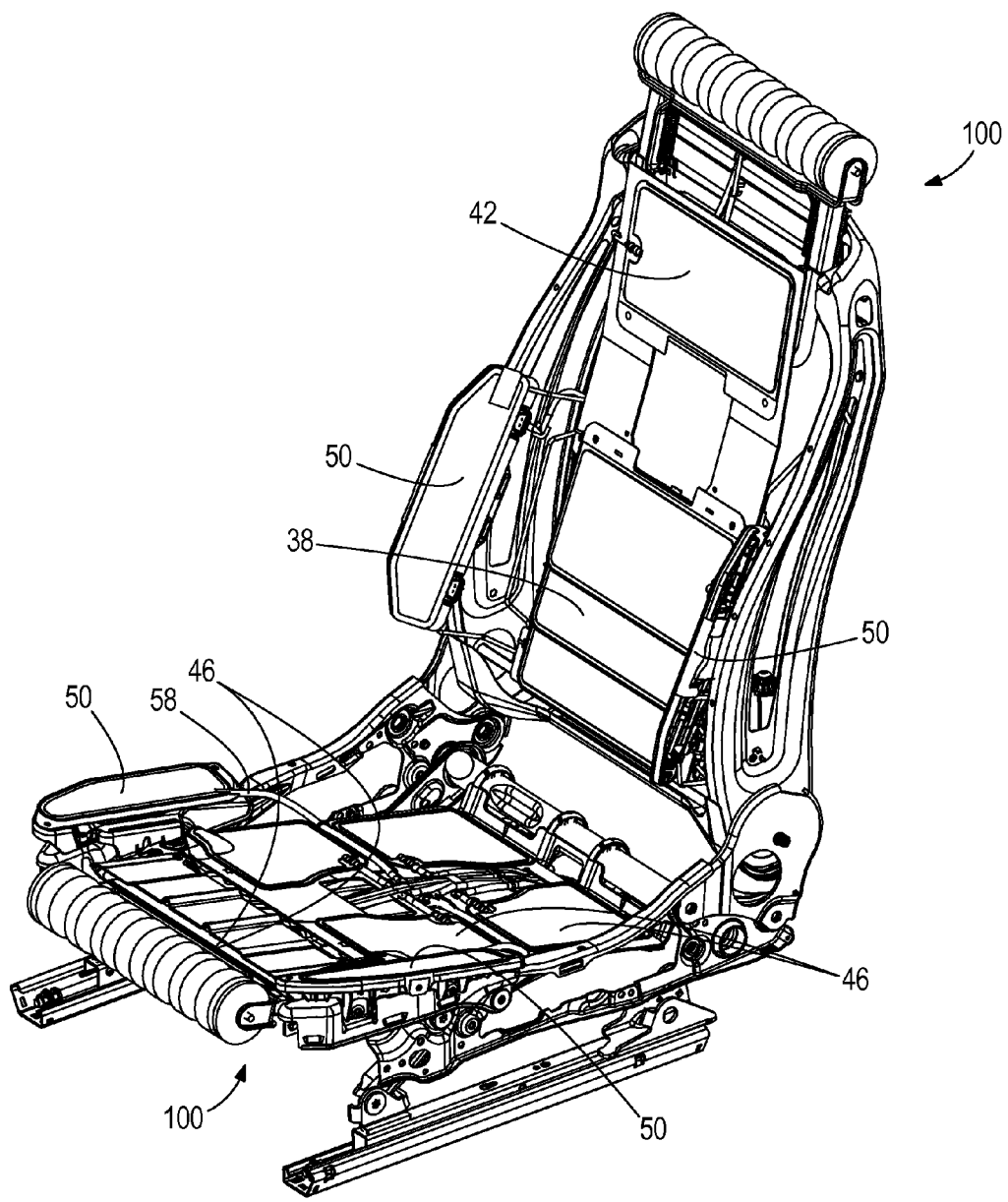
FIG. 3 is a front perspective view of the adjustable seat of FIG. 1 with the overlying cushions removed illustrating a drive assembly mounted proximal the head rest and a drive assembly mounted proximal the thigh support.

The seat 10 includes a number of support components adjustable by the user for added comfort and support. Referring also to FIG. 3, the seat bottom 14 and seat backrest 18 can include adjustable lumbar supports 38, sacral supports, upper shoulder supports 42, hip and leg supports 46, side bolsters 50, and other modules and like adjustable components. As shown in FIG. 2, these adjustable components receive a source of pressurized fluid (e.g., compressed air) from one or more pneumatic drives, such as a first pump 54 and/or a second pump 56. As illustrated, a plurality of pressurized fluid lines 58 distribute the pressurized fluid to the different aforementioned support and module locations throughout the adjustable seat 10. The first pump 54 distributes pressurized fluid to the adjustable components of the seat backrest 18, and the second pump 56 distributes pressurized fluid to the adjustable components of the seat bottom 14. The use of the two pumps 54, 56 eliminates the need for additional pneumatic connections when assembling the seat backrest 18 to the seat bottom 14. The two pneumatic pumps 54, 56 so positioned keep the center of gravity of the seat 10 low and are less noisy and expensive than a plurality of mechanical actuators associated with each support or module located throughout a seat. A control unit (not shown) redirects pressurized fluid where necessary from the pumps 54, 56 based on user activation. In some applications, a single pneumatic pump supplies pressurized fluid to all of the adjustable components of the seat 10, including to the drive assemblies to be described herein.

Figure 4:
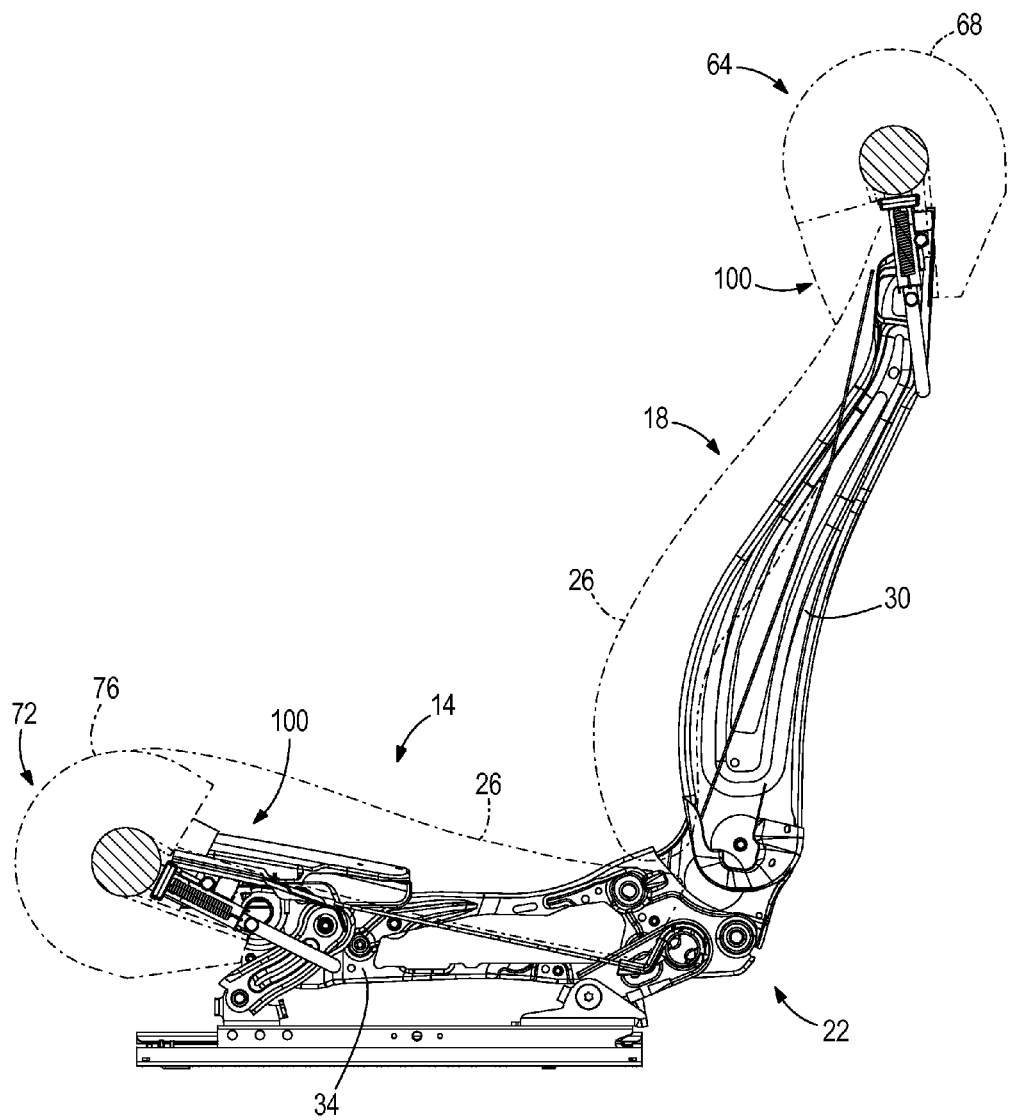
FIG. 4 is a cross-sectional view of the adjustable seat of FIG. 1 with the head rest and thigh support in a retracted, first position.

As illustrated in FIGS. 3 and 4, a headrest 64 is coupled to the seat back frame portion 30 to support an occupant's head and includes a resilient head cushion 68. The cushion 68 is adjustable by a drive assembly 100 from a retracted state to an extended state, and to and from a pivoted position, as will be further described below. Similarly, a thigh support 72 is coupled to the seat bottom frame portion 34 to support an occupant's thighs and includes a resilient thigh cushion 76 similarly adjustable by another drive assembly 100.

The first drive assembly 100 mounted proximal to the headrest 64 is similar to the second drive assembly 100 mounted proximal to the thigh support 72 and common components will be referenced herein as the same. Depending on the seat application, the second drive assembly may be larger or smaller than the first drive assembly. Referring to FIGS. 5 and 6, the drive assembly 100 includes an arcuate contact member, or roller 104, rotatable about a roller pin 108 supported by a roller bracket 112. The roller 104 is operative with an inside surface of the head cushion 68 (or the thigh cushion 76) and is grooved 114 along its length, the purpose of which will be further explained below. The roller bracket 112 includes a first bladder engagement surface 116 facing away from the roller 104 and is secured to a rail 120 at the ends of a first slide rail portion 124 and a second slide rail portion 128.

Figure 9A:
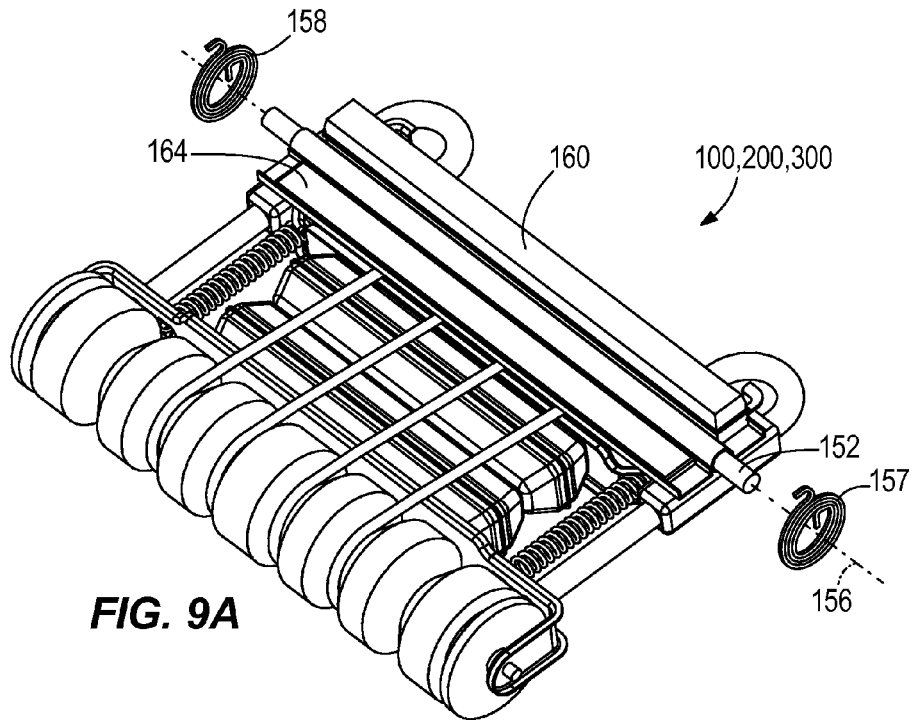
FIG. 9A is a perspective view of the drive assembly of FIG. 5 in a first mounting configuration.

A mounting bracket 132 includes first and second lateral members 136 each including an aperture 140 for slidably receiving the first and second slide rail portions 124, 128, respectively. A pivot bracket 144 extends from the first lateral member 136 to the second lateral member 136 and is coupled thereto. The pivot bracket 144 includes a centrally located tubular portion 148 formed to receive a pivot bar 152, which defines a pivot axis 156 and serves as an anchor point between the drive assembly 100 and the seat frame 22. Referring also to FIG. 9A, the drive assembly 100 is mounted to the frame 22 in a first mounting configuration that includes a first clock spring 157 and a second clock spring 158 oriented at each end of the pivot bar 152 to rotationally bias the drive assembly 100 toward the occupant, in either a retracted or extended position. The pivot bracket 144 includes a first expandable pivot bladder 160 and a second expandable pivot bladder 164 coupled thereto and positioned on either side of the tubular portion 148. In the first mounting configuration, the pivot bladders 160, 164 are inflatable to pivot the drive assembly 100 away from the occupant.

The mounting bracket 132 includes a second bladder engagement surface 168 that couples the mounting bracket 132 to the first bladder engagement surface 116 of the roller bracket 112 through an expandable bladder 172 positioned therebetween. The expandable bladder 172 is inflatable via pressurized fluid provided through one of the fluid lines 60 coupled to one of the pneumatic pumps 54, 56 to drive motion of the drive assembly 100, as will be explained in further detail.

First and second biasing members, such as springs 176, are secured to both the roller bracket 112 and the mounting bracket 132. As illustrated, the mounting bracket 132 includes first and second flanges 180 for attachment of the spring 176, though the exact mounting bracket attachment point can vary. The rail 120 further includes a laterally extending support band portion 184 between the slide rail portions 124, 128. A plurality of support bands 188 are coupled between the support band portion 184 and the grooves 114 of the roller 104, which assist in keeping the support bands 188 in position and aligned substantially parallel to each other during movement of the roller 104.

Figure 7:
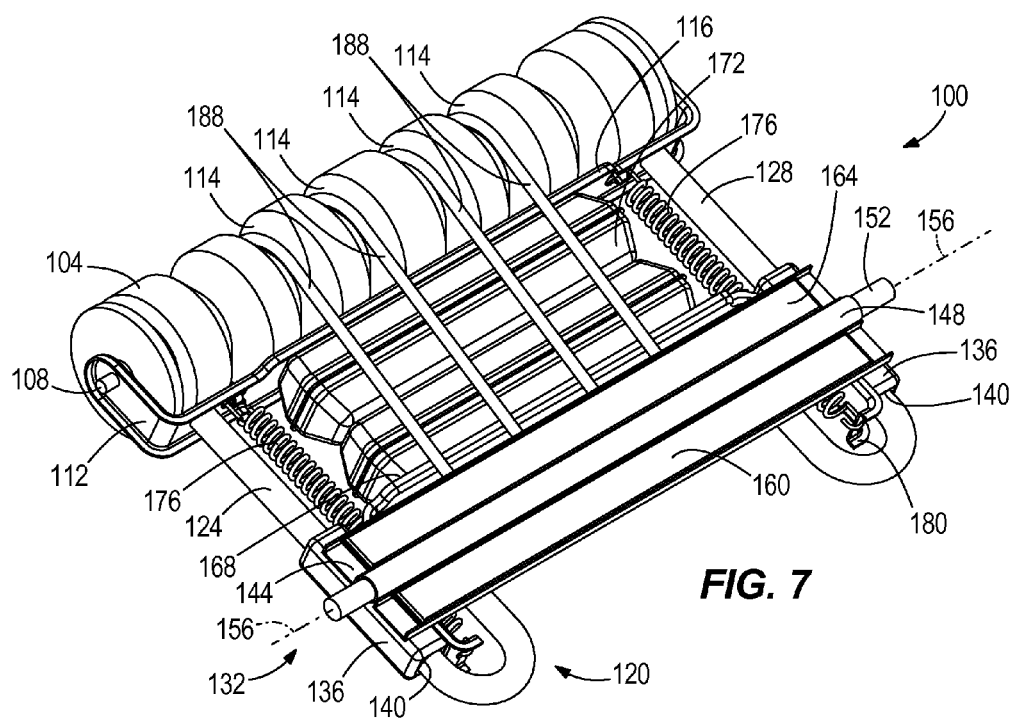
FIG. 7 is a perspective view of the drive assembly of FIG. 5 in an extended, second position.
Figure 8:
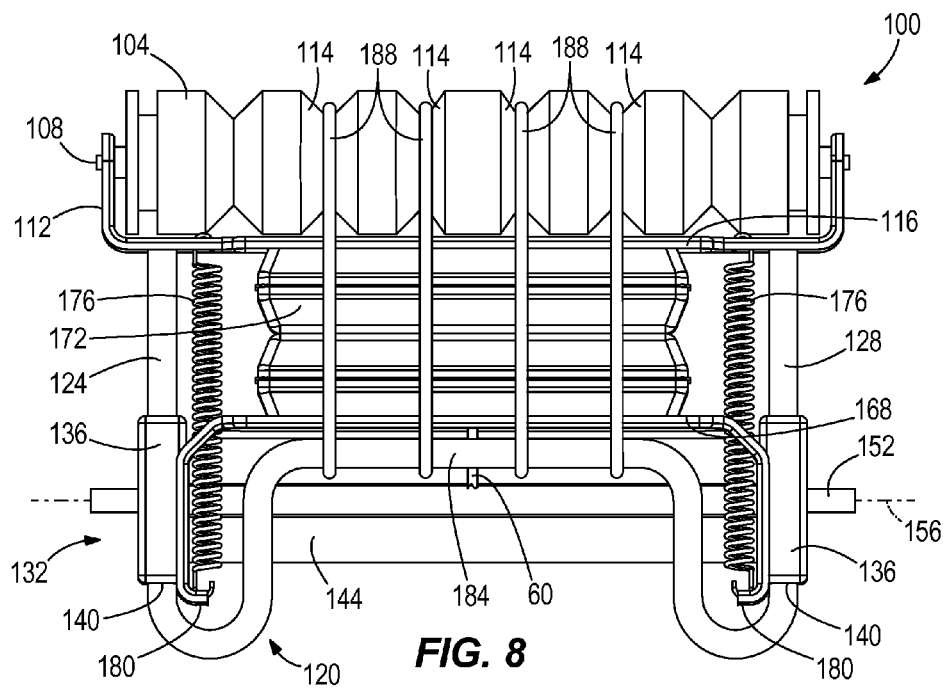
FIG. 8 is a front view of the drive assembly of FIG. 7.

FIGS. 5 and 6 illustrate the drive assembly 100 in the first, retracted position. In the retracted position, the bladder 172 is deflated and the springs 176 bias the first bladder engagement surface 116 toward the second bladder engagement surface 168. Upon receiving the source of pressurized fluid via a pump 54, 56, the bladder 172 inflates, forcing the first bladder engagement surface 116 on the roller bracket 112 and the second bladder engagement surface 168 on the mounting bracket 132 apart, as shown in FIGS. 7 and 8.

Because the mounting bracket 132 is coupled to the seat frame 22, the force from the inflating bladder 172 pushes the roller bracket 112 and the roller 104 away from the mounting bracket 132, with the first and second slide rail portions 124, 128 translating upward through the apertures 140 of the first and second lateral members 136.

As the bladder 172 inflates, the roller bracket 112 and the roller 104 extend away from the mounting bracket 132. The support bands 188, which translate concurrently with the roller bracket 112 within the cushion 68 (or 76) are simultaneously positioned between the occupant's head (or thigh) and the expanding bladder 172 to provide a resilient surface for the cushion and to concurrently protect the expanded bladder 172 from inadvertent direct contact, by the occupant or otherwise. To return to the retracted first position, the bladder 172 is deflated through the pneumatic tubing 60, either locally or back to the pump 54, 56, and the coil springs 176 bias the roller bracket 112 back toward the mounting bracket 132 to the position shown in FIGS. 5 and 6. Changing the bladder size or the number of sections of the bladder 172 modifies the amount of extension of the roller 104 and thus increases or decreases the amount of travel of the headrest 64 or thigh support 72.

Figure 10:
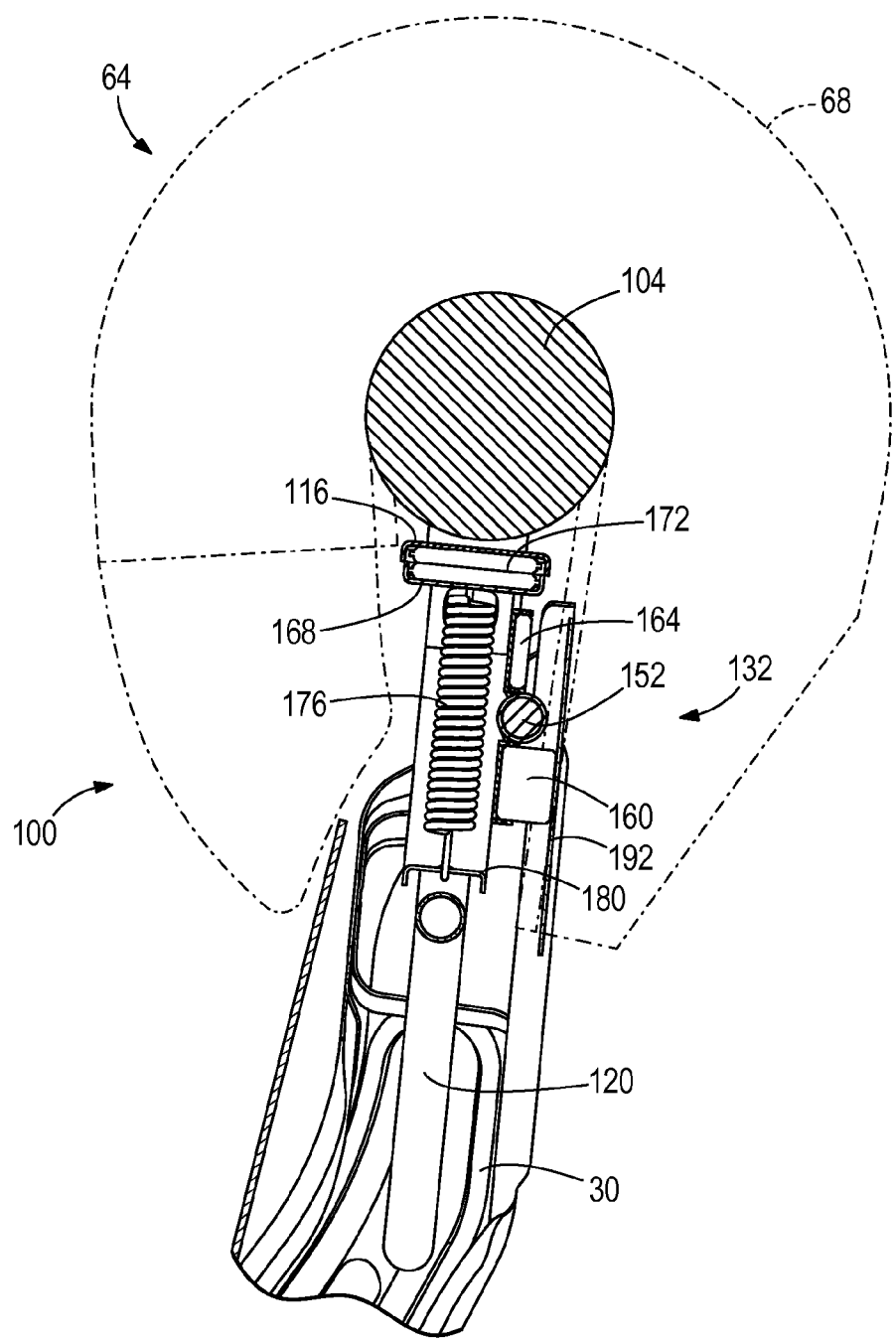
FIG. 10 is a partial cross-sectional view of the drive assembly of FIG. 5 in the retracted, first position coupled to a head rest in the mounting configuration of FIG. 9A.
Figure 11:
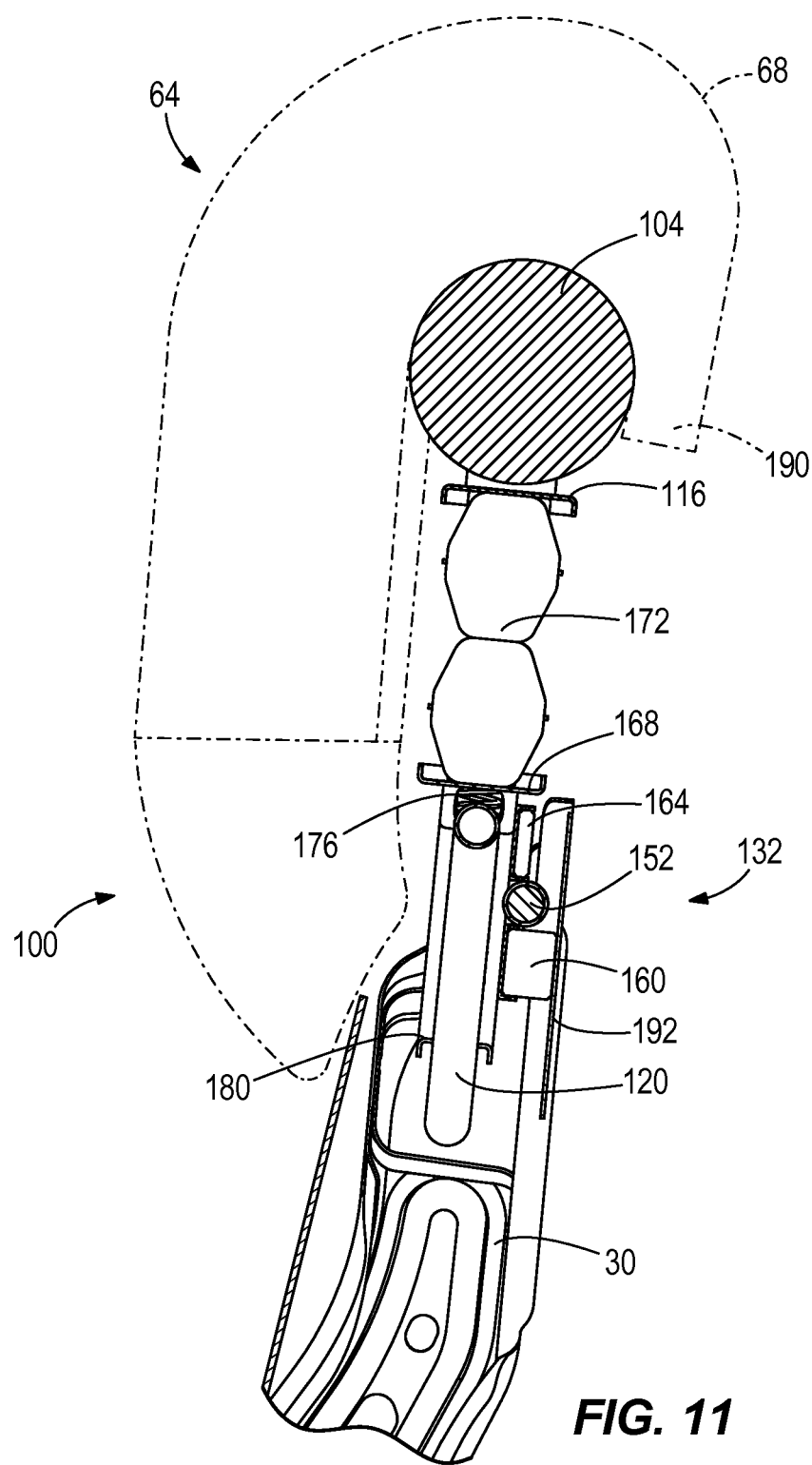
FIG. 11 is a partial cross-sectional view of the drive assembly of FIG. 5 in the extended, second position coupled to a head rest in the mounting configuration of FIG. 9A.
Figure 12:
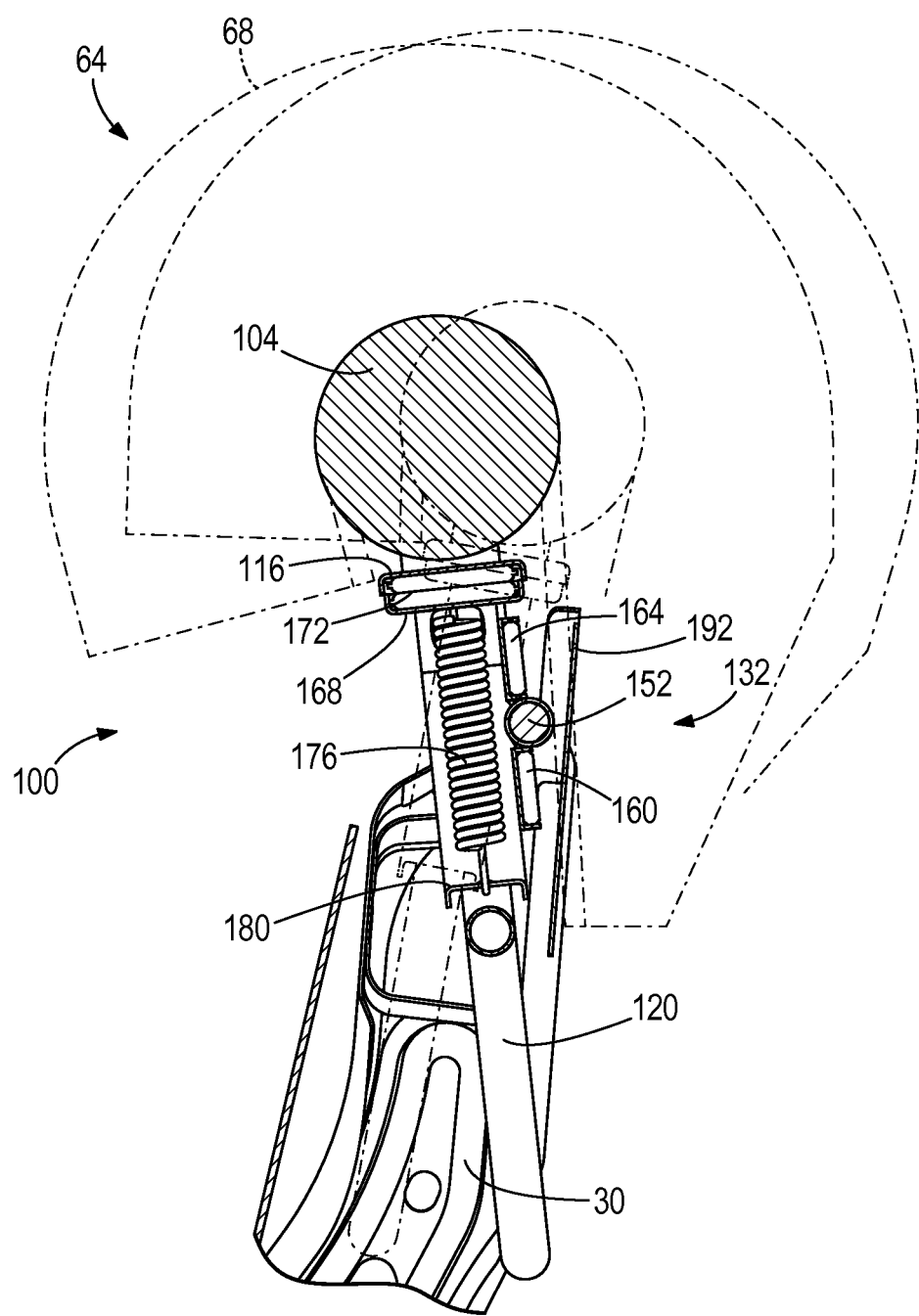
FIG. 12 is a partial cross-sectional view of the drive assembly of FIG. 5 in a pivoted, third position coupled to a head rest in the first mounting configuration of FIG. 9A.

The first pivoting bladder 160 and the second pivoting bladder 164 are, upon receiving a source of pressurized fluid, inflatable to rotate the driving assembly 100 about the pivot axis 156—in either the retracted first position or the extended second position—to a pivoted third position. With the mounting configuration of FIG. 9A previously discussed, the pivot bladders 160, 164 can inflate to pivot the driving assembly 100 away from the seat occupant, against the biasing force of clock springs 157, 158. Specifically, FIG. 10 illustrates the drive assembly 100 coupled to the head cushion 68 in the retracted, first position, in which the bladder 172 is deflated and the coil springs 176 bias the roller bracket 112 toward the mounting bracket 132. The pivot bladder 160 is inflated to engage a pivot engagement surface 192 of the seat back frame portion 30 to hold the drive assembly 100 rotationally away from the occupant's head, against the biasing force of clock springs 157, 158. FIG. 11 illustrates the drive assembly 100 coupled to the head cushion 68 in the extended, second position, in which the bladder 172 is inflated, forcing the roller 104 away from the mounting bracket 132 and unfurling the cushion 68. One or more bungee elements (not shown) can be fixed to the frame and a rear surface 190 of the cushion to keep the cushion taut as the roller 104 extends. The support bands 188 are not illustrated in FIGS. 10-12 for clarity, but provide additional support to the cushion 68. FIG. 12 illustrates the drive assembly 100 coupled to the head cushion 68 in the pivoted third position, in which the pivot bladder 160 is deflated to permit the clock springs 157, 158 to fully bias the drive assembly 100 toward the occupant's head.

Figure 13:
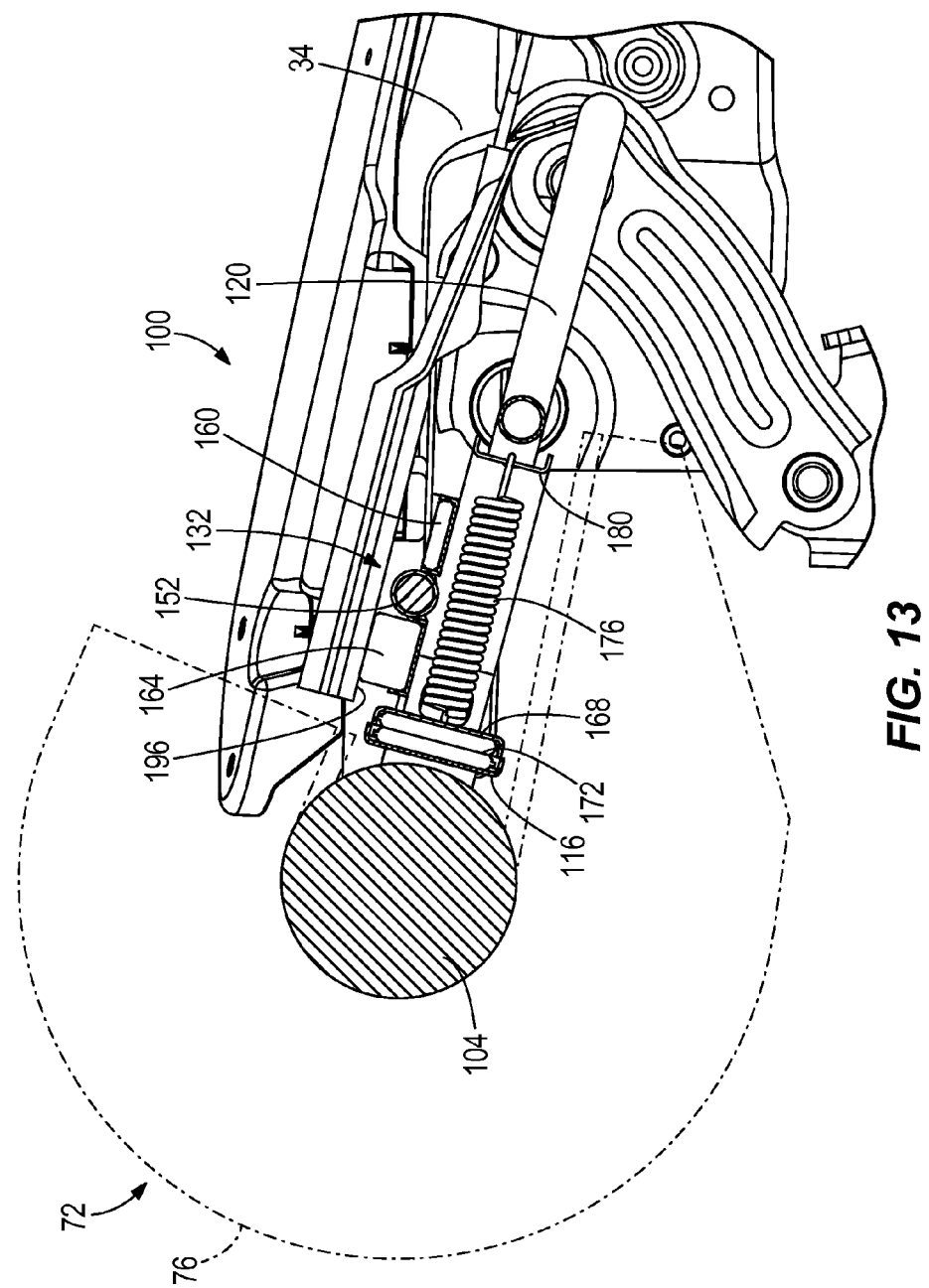
FIG. 13 is a partial cross-sectional view of the drive assembly of FIG. 5 in the retracted, first position coupled to a thigh support in the mounting configuration of FIG. 9A.
Figure 14:
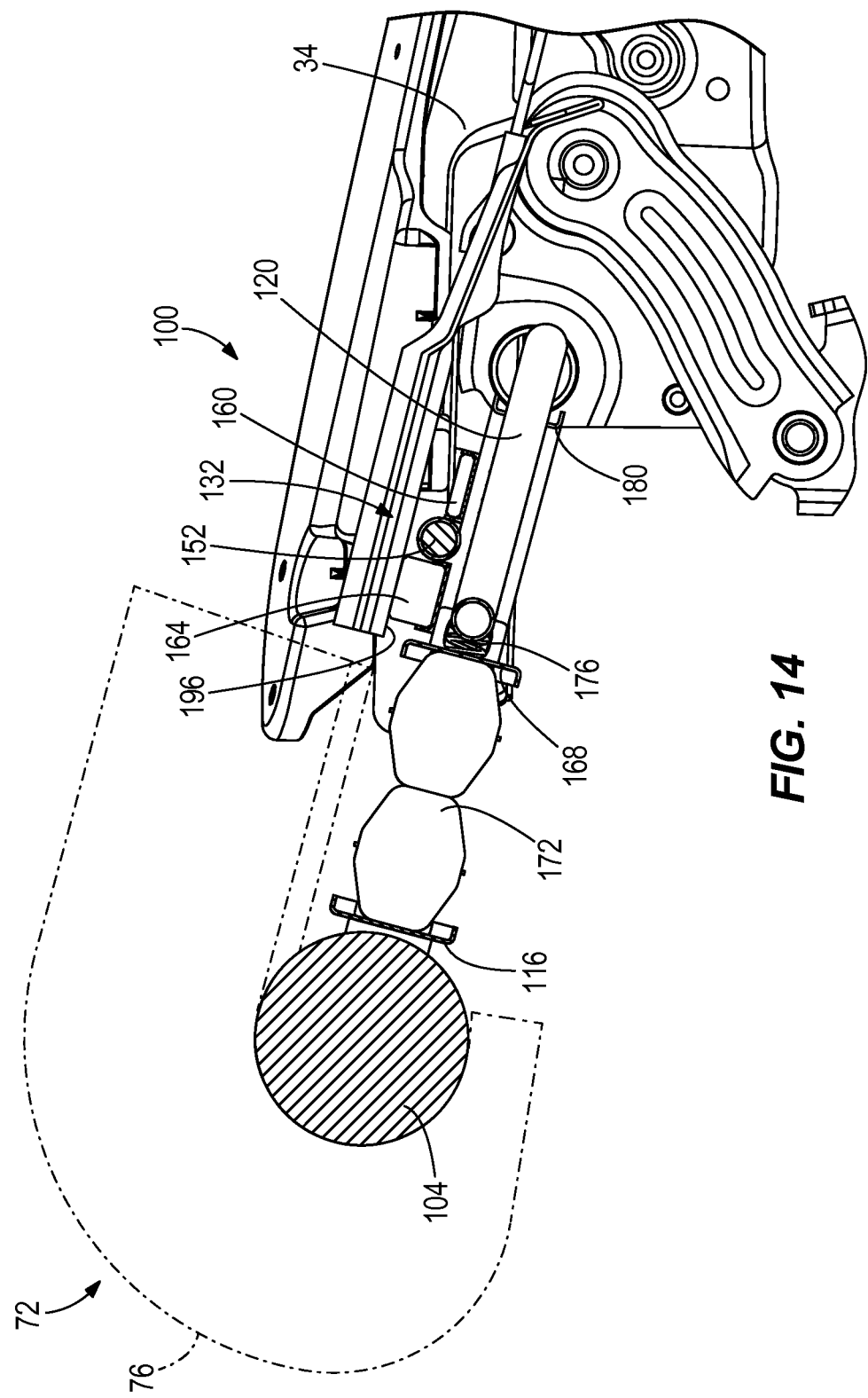
FIG. 14 is a partial cross-sectional view of the drive assembly of FIG. 5 in the extended, second position coupled to a thigh support in the mounting configuration of FIG. 9A.
Figure 15:
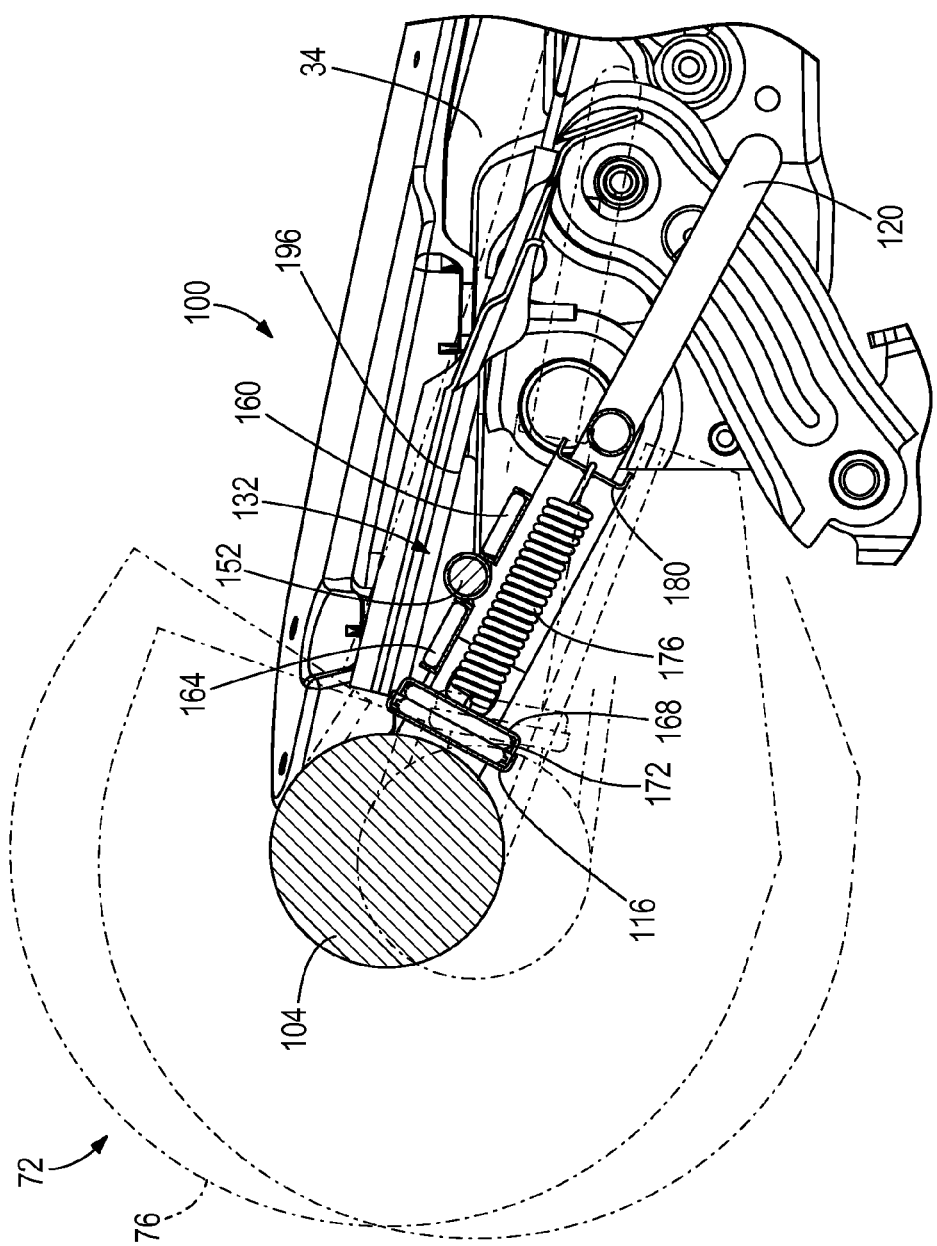
FIG. 15 is a partial cross-sectional view of the drive assembly of FIG. 5 in the pivoted, third position coupled to a thigh support in the mounting configuration of FIG. 9A.

FIG. 13 illustrates the drive assembly 100 coupled to the thigh cushion 76 in the retracted, first position, in which the bladder 172 is deflated and the coil springs 176 bias the roller bracket 112 toward the mounting bracket 132. The pivot bladder 164 is inflated to engage a pivot engagement surface 196 of the seat bottom frame portion 34 to hold the drive assembly 100 downward and rotationally away from the occupant's thighs, against the biasing force of the clock springs 157, 158. FIG. 14 illustrates the drive 100 coupled to the thigh cushion 76 in the extended, second position with the cushion 76 in the unfurled condition, which may include bungee elements previously described. FIG. 15 illustrates the drive assembly 100 coupled to the thigh cushion 76 in the pivoted, third position, in which the pivot bladder 164 is deflated to permit the clock springs 157, 158 to fully bias the drive assembly 100 toward the occupant's thighs. Though shown in FIGS. 12 and 15 in the retracted position, the drive assembly 100 is also biased toward the occupant's head or thighs by the springs 157, 158 in the extended position with the bladder 172 inflated.

Figure 16:
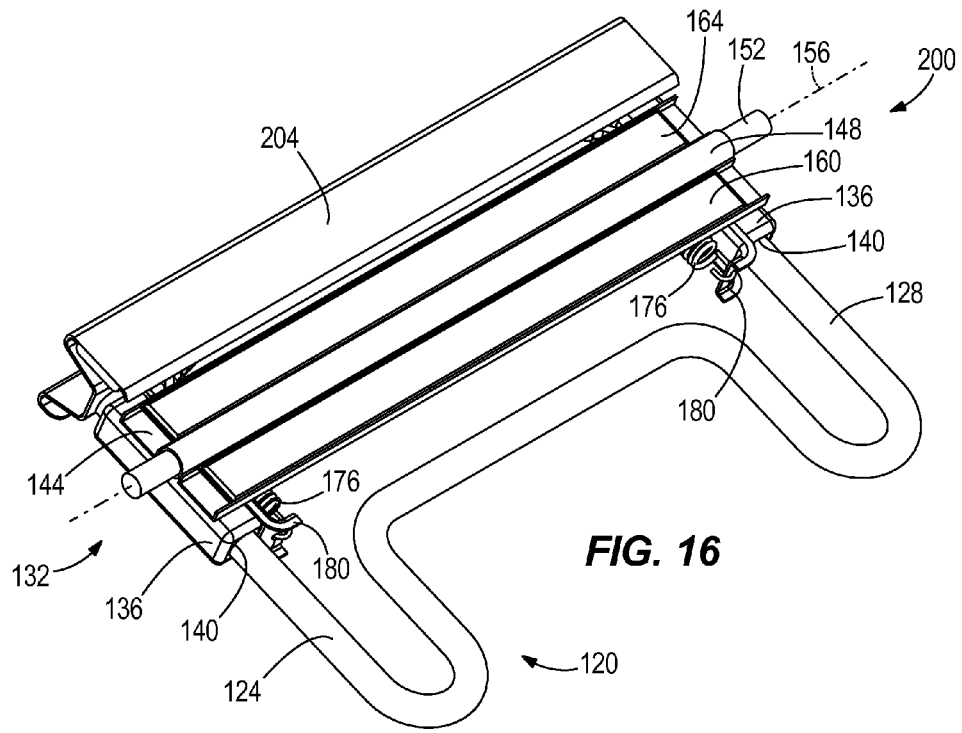
FIG. 16 is a perspective view of another drive assembly in a retracted, first position.
Figure 17:
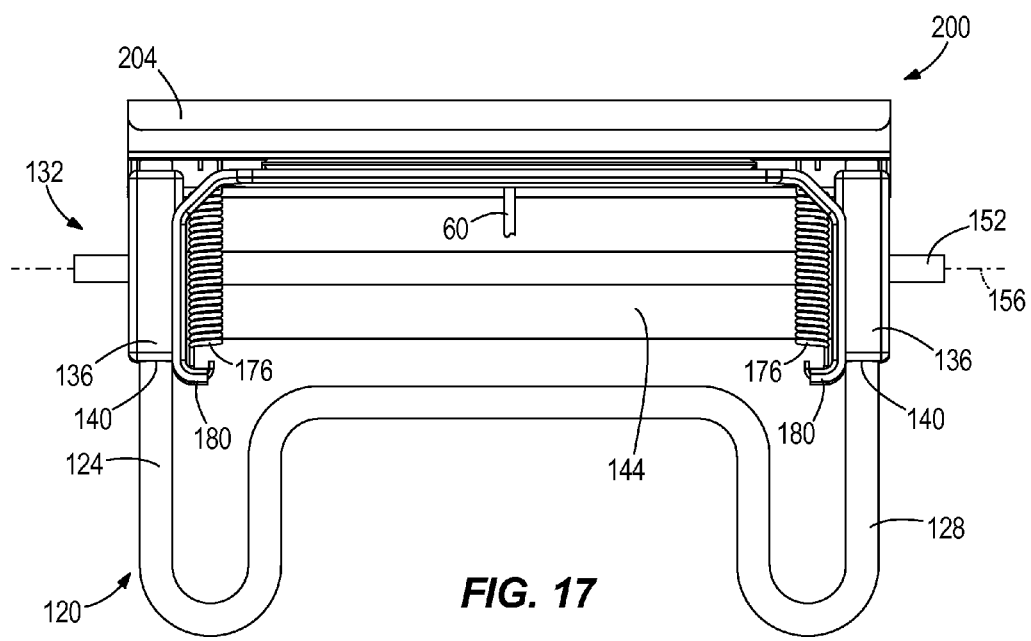
FIG. 17 is a front view of the drive assembly of FIG. 16.
Figure 18:
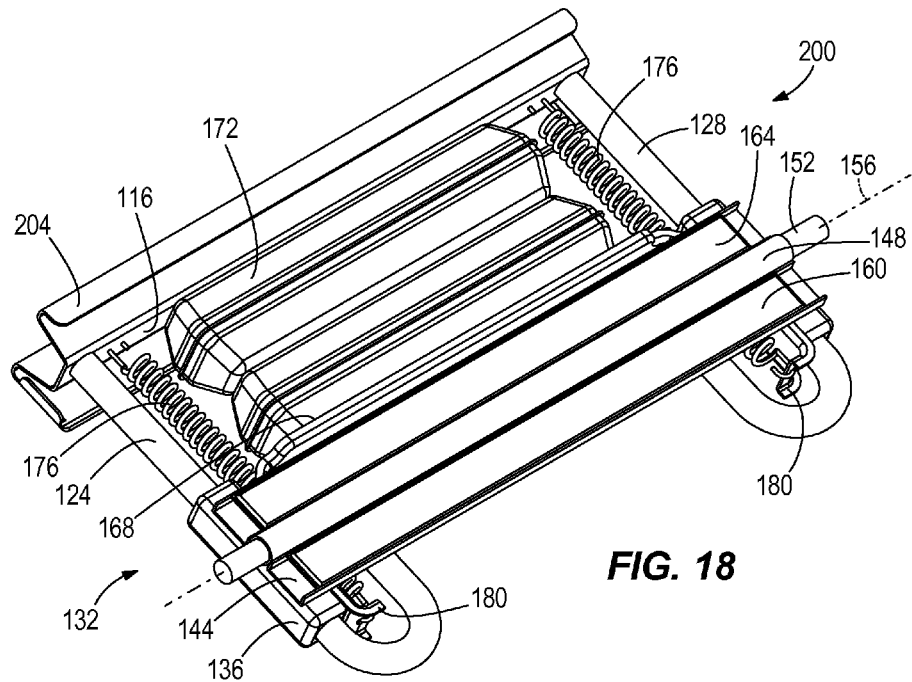
FIG. 18 is a perspective view of the drive assembly of FIG. 16 in an extended, second position.
Figure 19:
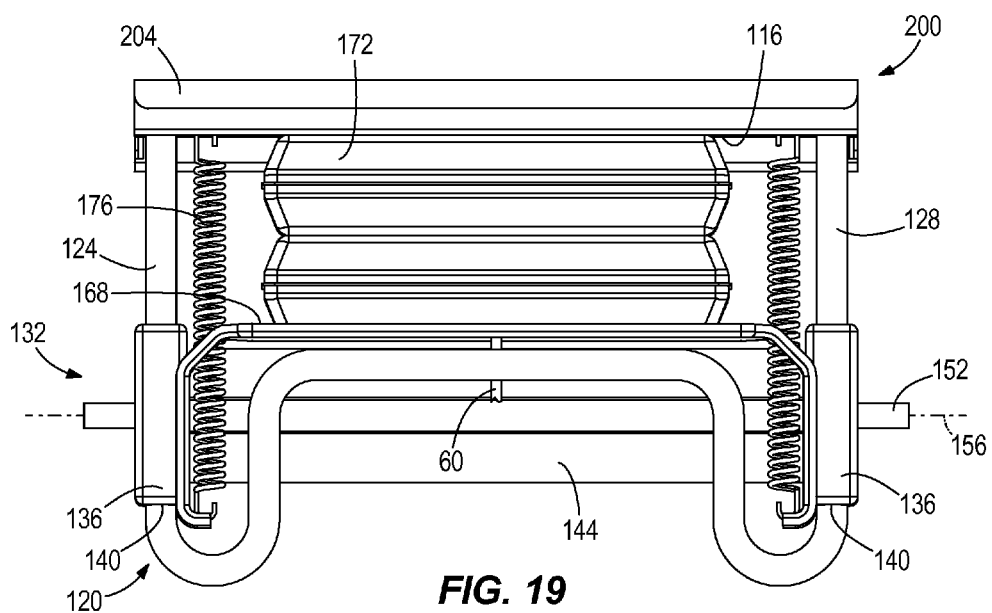
FIG. 19 is a front view of the drive assembly of FIG. 18.

FIGS. 16 and 17 illustrate a drive assembly 200 according to an additional embodiment of the invention. The drive assembly 200 includes a geometrically rectilinear contact member in the form of a bar 204. Features of the drive assembly 200 are similar to those of the drive assembly 100 and like components are similarly identified. The ends of the slide rail portions 124, 128 are coupled directly to the bar 204 for travel therewith. The coil springs 176 are also coupled, at one end, directly to the bar 204. The drive assembly 200 is illustrated in the retracted, first position with the bladder 172 deflated. FIGS. 18 and 19 illustrate the drive assembly 200 in the extended, second position with the bladder 172 inflated and the bar 204 positioned away from the mounting bracket 132, with the rail portions 124, 128 translated through the lateral members 136.

Figure 9B:
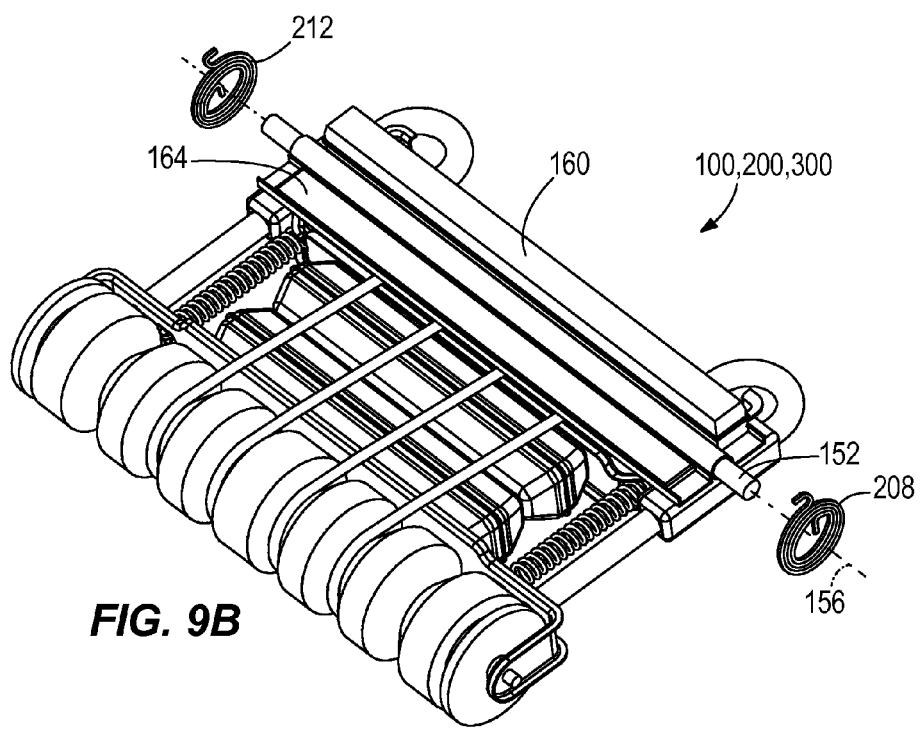
FIG. 9B is a perspective view of the drive assembly of FIG. 5 in a second mounting configuration.

Referring also to FIG. 9B, the drive assembly 200 is mounted to the frame 22 in a second mounting configuration having a first clock spring 208 and a second clock spring 212 oriented at each end of the pivot bar 152 in opposite directions to rotationally bias the drive assembly 200 neutrally, i.e., the spring forces balance out to keep the drive assembly 200 in a neutral position that is neither all the way forward (toward the occupant's head) nor all the way back. Though FIGS. 9A and 9B are illustrated with assembly 100, either of clock springs 157, 158 or clock springs 208, 212 can be used with either of assemblies 100 or 200.

Figure 20:
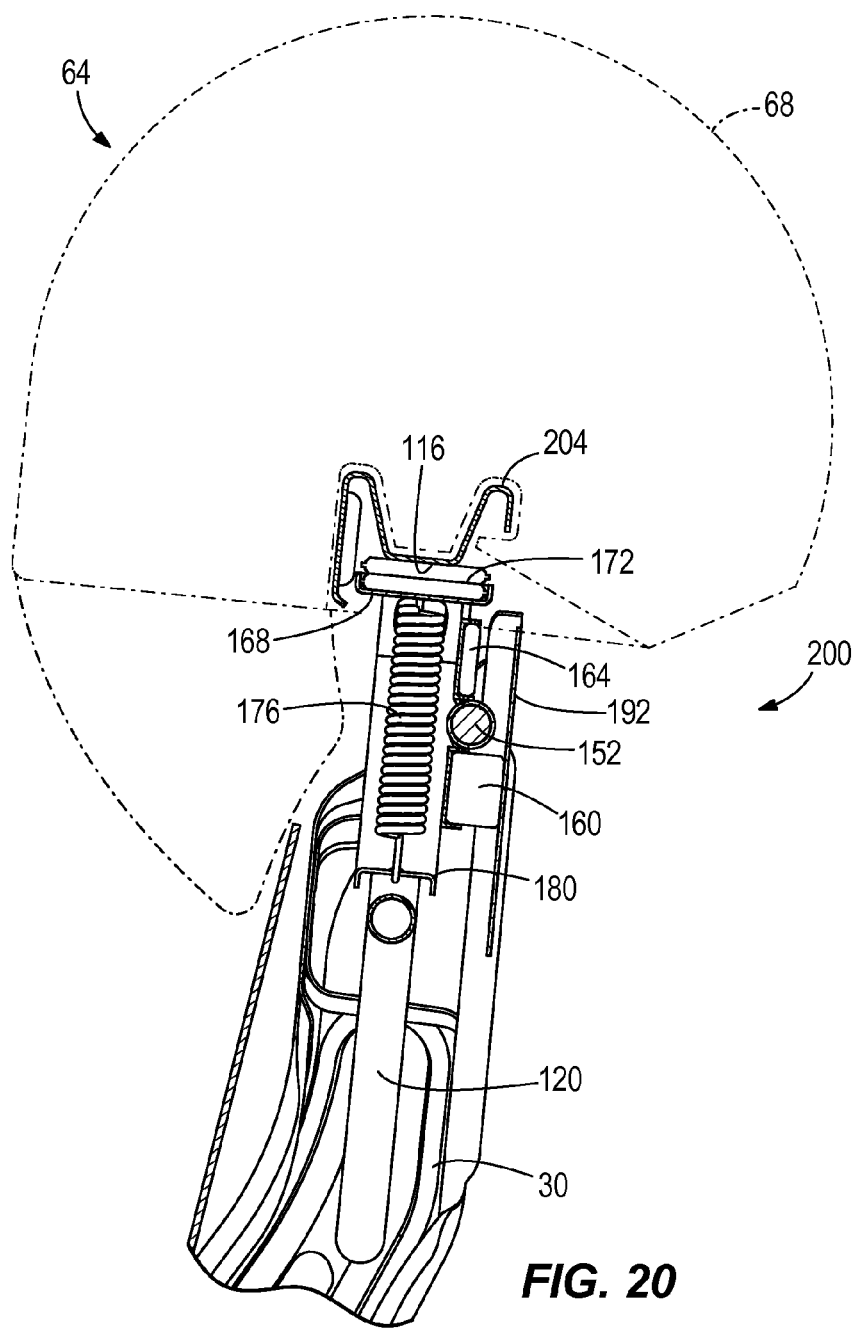
FIG. 20 is a partial cross-sectional view of the drive assembly of FIG. 16 in the retracted, first position coupled to a head rest in the mounting configuration of FIG. 9B.
Figure 21:
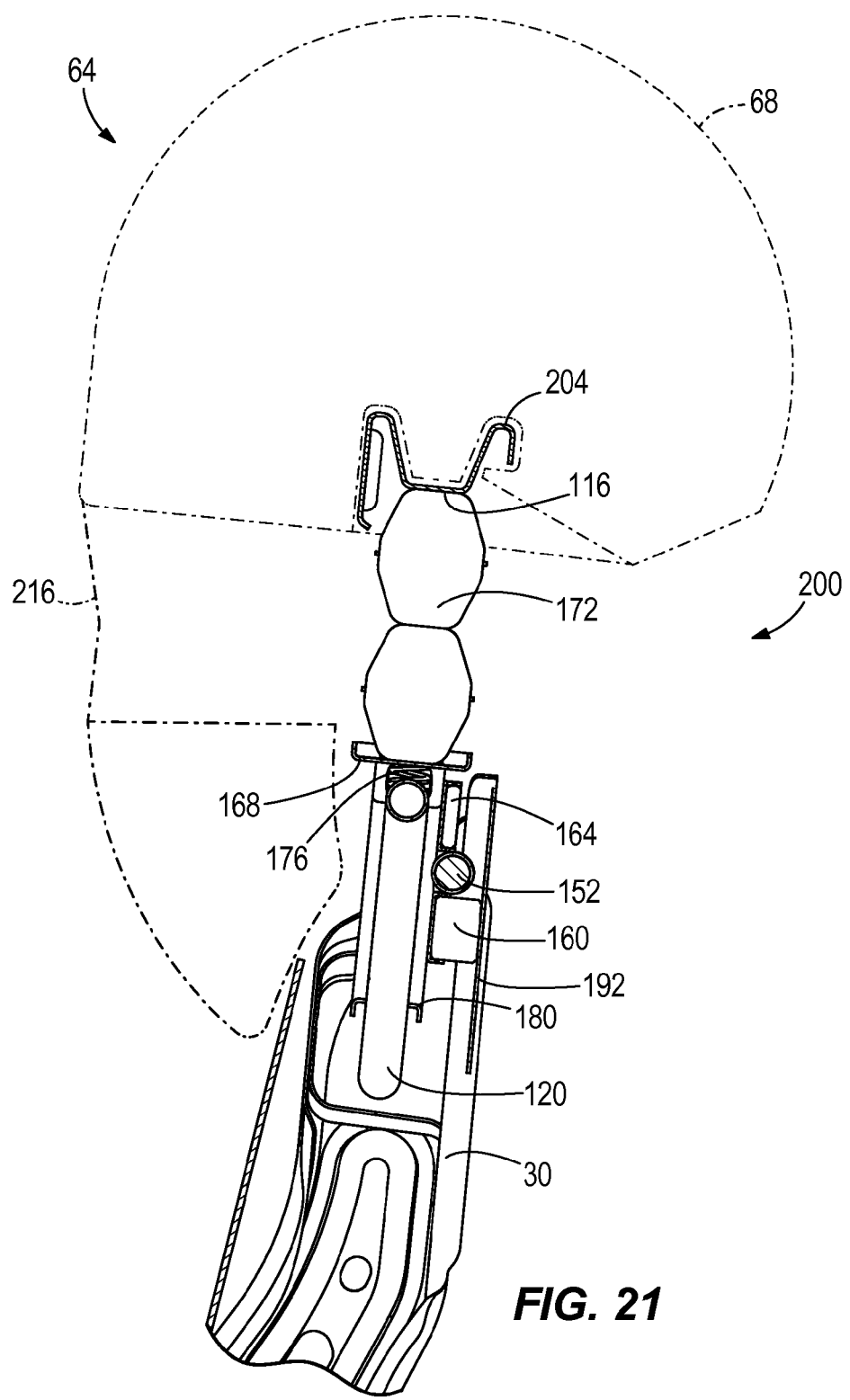
FIG. 21 is a partial cross-sectional view of the drive assembly of FIG. 16 in the extended, second position coupled to a head rest in the mounting configuration of FIG. 9B.
Figure 22:
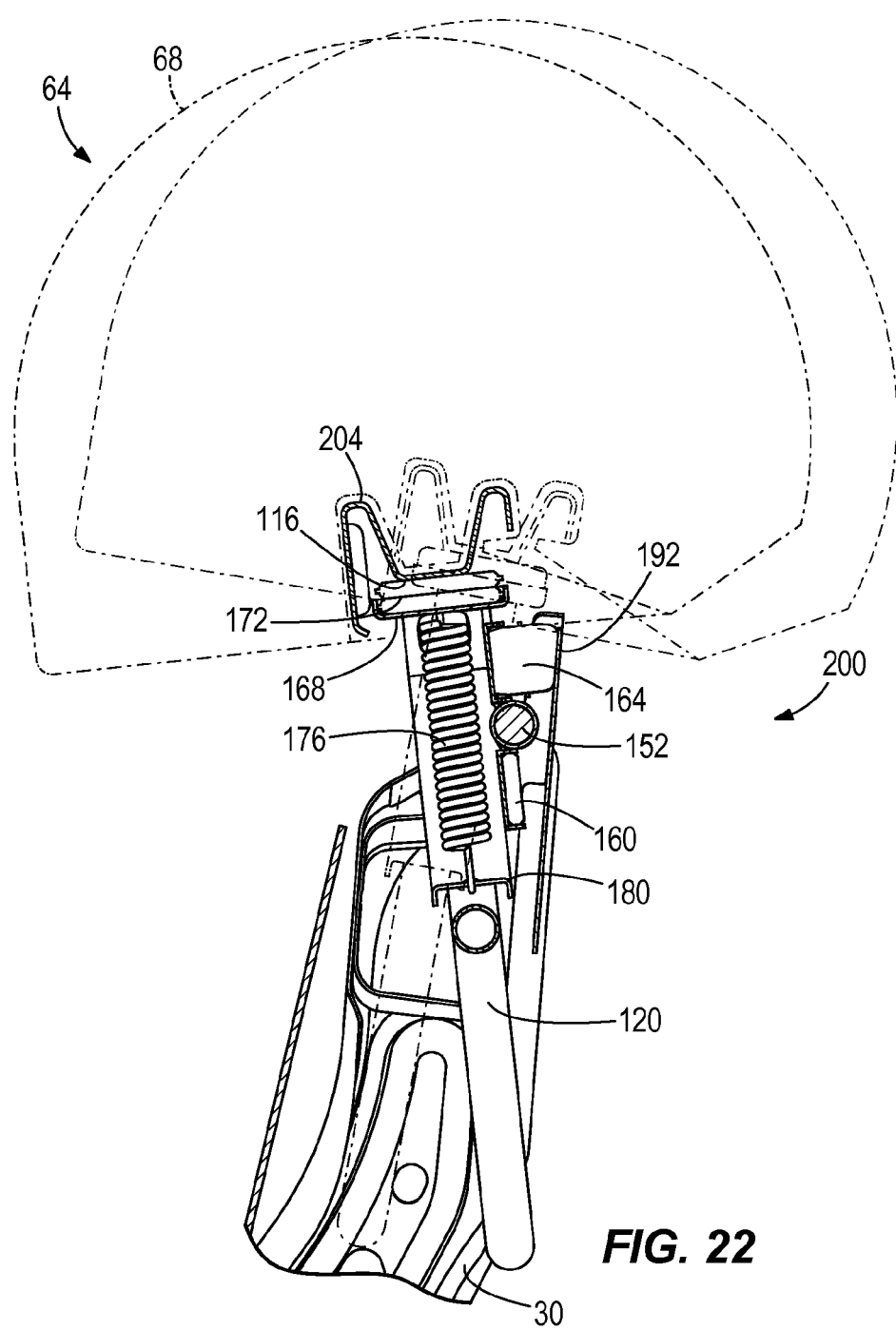
FIG. 22 is a partial cross-sectional view of the drive assembly of FIG. 16 in the pivoted, third position coupled to a head rest in the mounting configuration of FIG. 9B.

FIG. 20 illustrates the drive assembly 200 in the retracted, first position coupled to the head cushion 68, in which the bladder 172 is deflated and the pivoting bladder 160 is inflated to force the drive assembly to pivot away from the neutral position and away from the occupant's head. FIG. 21 illustrates the drive assembly 200 in the extended, second position with the bladder 172 inflated. The cushion 68 translates with the bar 204 and a fabric portion 216 covers the frontward gap created by the inflated bladder 172. FIG. 22 illustrates the drive assembly 200 in the pivoted, third position with the pivot bladder 164 inflated and engaged with the pivot engagement surface 192 to pivot the drive assembly 200 toward the occupant's head, away from the biased neutral position.

Figure 23:
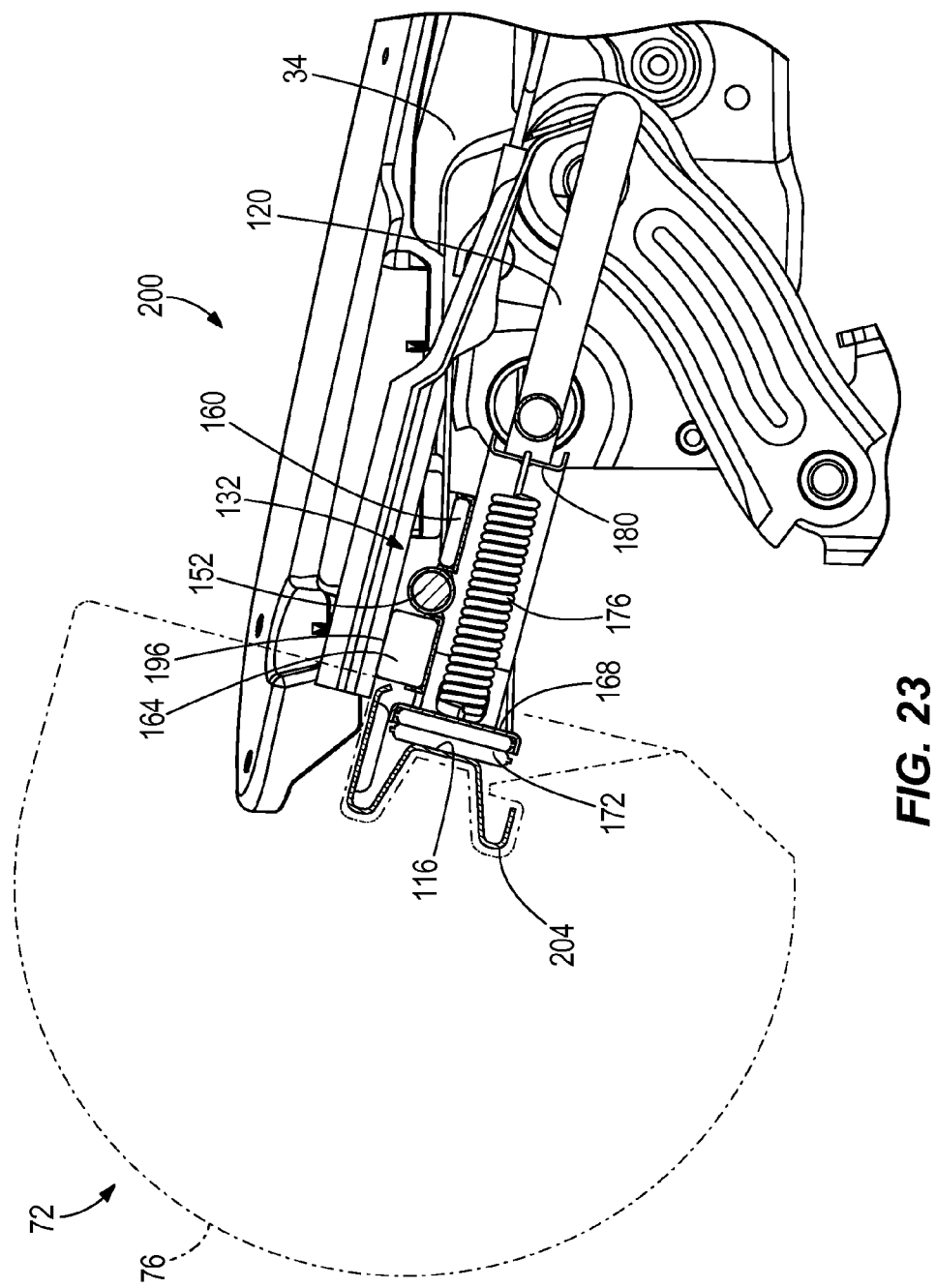
FIG. 23 is a partial cross-sectional view of the drive assembly of FIG. 16 in the retracted, first position coupled to a thigh support in the mounting configuration of FIG. 9B.
Figure 24:
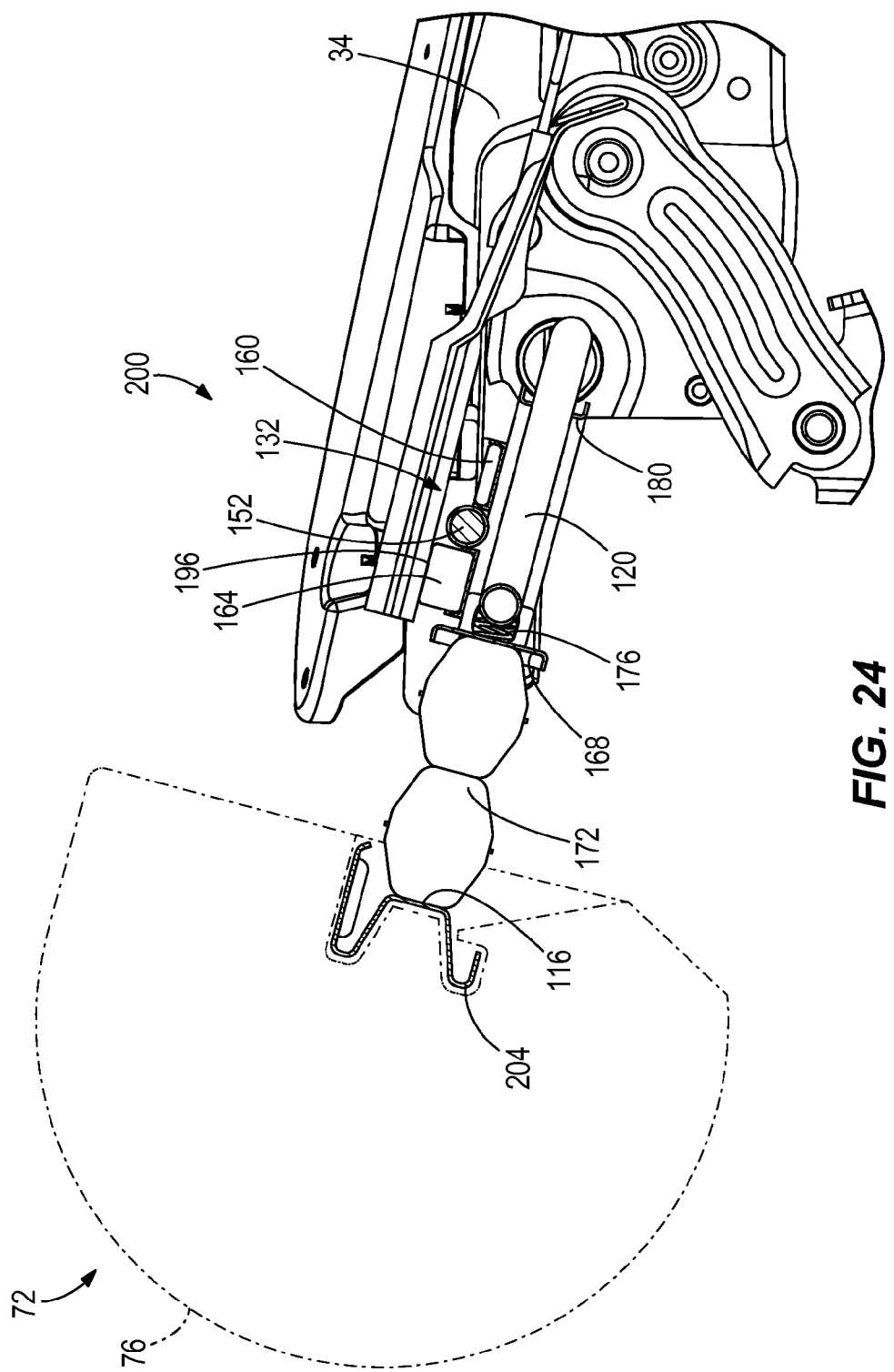
FIG. 24 is a partial cross-sectional view of the drive assembly of FIG. 16 in the extended, second position coupled to a thigh support in the mounting configuration of FIG. 9B.
Figure 25:
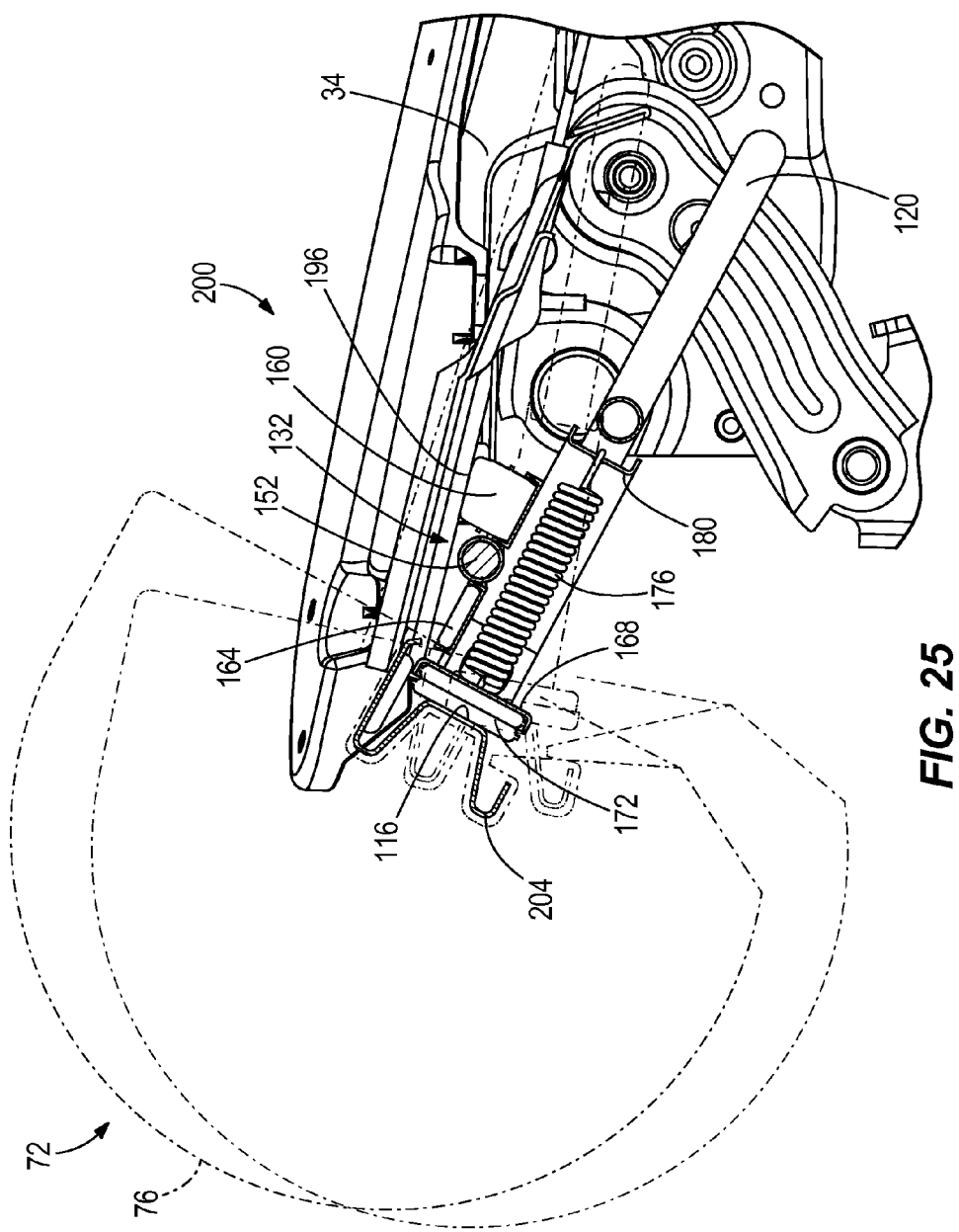
FIG. 25 is a partial cross-sectional view of the drive assembly of FIG. 16 in the pivoted, third position coupled to a thigh support in the mounting configuration of FIG. 9B.

FIG. 23 illustrates the drive assembly 200 in the retracted, second position coupled to the thigh cushion 76, in which the pivoting bladder 164 is inflated to engage the pivot engagement surface 196 to pivot the drive assembly 200 away from the neutral position and away from the occupant's thighs. FIG. 24 illustrates the drive assembly 200 in the extended, second position, with continued inflation of pivoting bladder 164. FIG. 25 illustrates the drive assembly 200 in the pivoted, third position with the pivot bladder 164 deflated and the pivot bladder 160 inflated and engaged with the pivot engagement surface 196 to pivot the drive assembly 200 away from the neutral position and toward the occupant's thighs. Though shown in FIGS. 22 and 25 in the retracted position, the drive assembly 200 is also pivotable as described in the extended position with the bladder 172 inflated.

Figure 26:
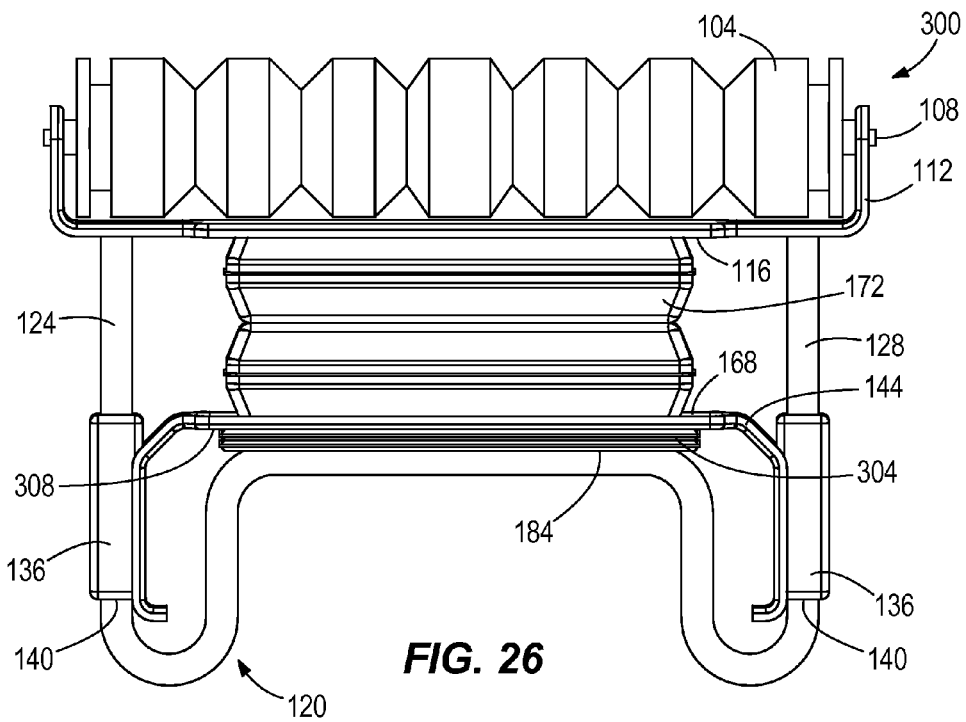
FIG. 26 is a front view of another drive assembly in an extended position.
Figure 27:
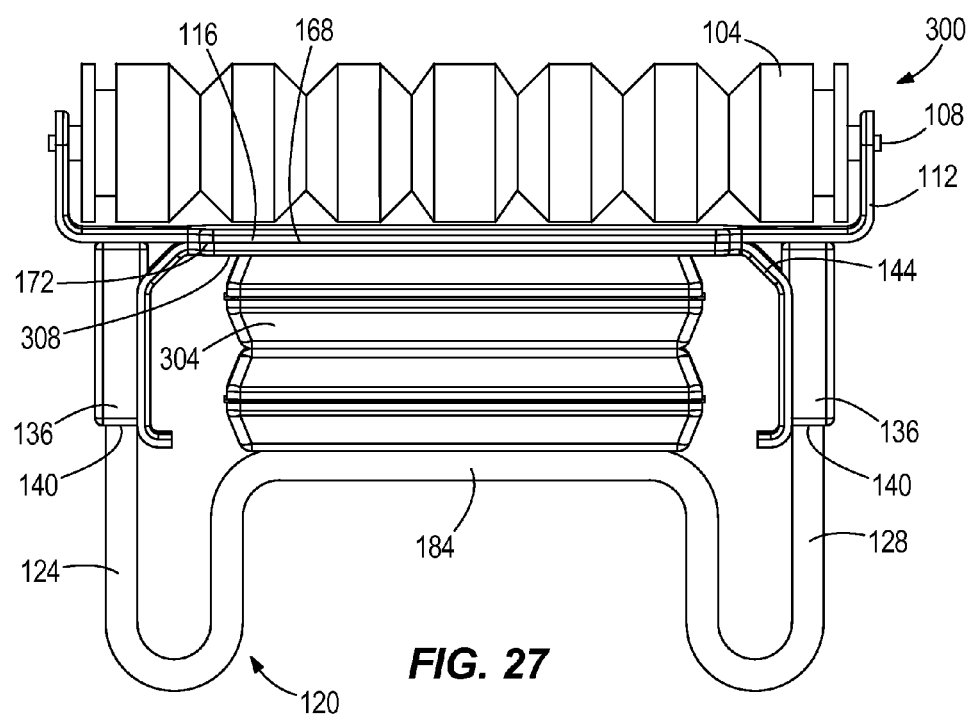
FIG. 27 is a front view of the drive assembly of FIG. 26 in a retracted position.

FIGS. 26 and 27 illustrate a drive assembly 300 according to an additional embodiment of the invention. Features of the drive assembly 300 are similar to those of the drive assembly 100 and like components are similarly identified (portions of the pivot bracket 144 and the pivot bar 152 are not shown for clarity). The bladder 172 is positioned between the first bladder engagement surface 116 and the second bladder engagement surface 168 for extension of the roller 104 as previously described. In lieu of biasing springs, a second bladder 304 is coupled to an underside 308 of the bracket 144 between the bracket 144 and the support band portion 184. Coupling of the bladder 304 to the support band portion 184 can be accomplished with an additional bracket or through other means of securing the bladder 304 to the portion 184. The bladder 304 is inflatable to retract the roller 104. Specifically, in operation, upon inflation of the bladder 304 the bladder 172 is concurrently deflated (through pneumatic tubing), driving the engagement surface 116 toward the engagement surface 168, with the first and second slide rail portions 124, 128 translating downward through the apertures 140 of the first and second lateral members 136 to the position of FIG. 27. The drive assembly 300 is operable with either of the mounting configurations shown in FIGS. 9A and 9B and is further operable to pivot from either the retracted or extended position.

Various features and advantages of the invention are set forth in the following claims.

What is claimed is:

1. A pneumatically adjustable seat comprising:
   a seat frame having a seat back frame portion;
   a headrest coupled to the seat back frame portion, the headrest including a resilient cushion; and
   a drive assembly coupled to the seat back frame portion, the drive assembly including
      a contact member operatively associated with the resilient cushion,
      a bladder operatively coupled to the contact member and in fluid communication with a source of pressurized fluid, wherein inflation of the bladder via the source of pressurized fluid moves the contact member from a first position to a second position along a first direction, and
      a support member disposed between an interior surface of the headrest and the bladder, wherein the support member is configured to resist movement of the interior surface of the headrest toward the bladder in a second direction transverse to the first direction.

2. The adjustable seat of claim 1, wherein the contact member engages the resilient cushion with an arcuate surface.

3. The adjustable seat of claim 1, wherein the contact member engages the resilient cushion with a rectilinear surface.

4. The adjustable seat of claim 1, wherein the drive assembly is pivotally coupled to the seat back frame portion and further comprising a second bladder operatively coupled to the drive assembly and in fluid communication with a source of pressurized fluid, wherein inflation of the second bladder via the source of pressurized fluid moves the contact member from a third position to a fourth position.

5. The adjustable seat of claim 1, wherein the contact member is biased to return automatically to the first position when the bladder is deflated.

6. The adjustable seat of claim 5, wherein the contact member is biased by a spring to return automatically to the first position when the bladder is deflated.

7. The adjustable seat of claim 1, wherein the support member moves with the contact member.

8. The adjustable seat of claim 1, wherein the support member is a support band.

9. The adjustable seat of claim 1, wherein the support member directly contacts the resilient cushion.

10. A pneumatically adjustable seat comprising:
    a seat frame having a seat cushion frame portion;
    a cushion extension portion coupled to the seat cushion frame portion, the cushion extension portion including a resilient cushion; and
    a drive assembly coupled to the seat cushion frame portion, the drive assembly including
       a contact member operatively associated with the resilient cushion,
       a bladder operatively coupled to the contact member and in fluid communication with a source of pressurized fluid, wherein inflation of the bladder via the source of pressurized fluid moves the contact member from a first position to a second position along a first direction, and
       a support member disposed between an interior surface of the cushion extension portion and the bladder, wherein the support member is configured to resist movement of the interior surface of the cushion extension portion toward the bladder in a second direction transverse to the first direction.

11. The adjustable seat of claim 10, wherein the contact member engages the resilient cushion with an arcuate surface.

12. The adjustable seat of claim 10, wherein the contact member engages the resilient cushion with a rectilinear surface.

13. The adjustable seat of claim 10, wherein the drive assembly is pivotally coupled to the seat cushion frame portion and further comprising a second bladder operatively coupled to the drive assembly and in fluid communication with a source of pressurized fluid, wherein inflation of the second bladder via the source of pressurized fluid moves the contact member from a third position to a fourth position.

14. The adjustable seat of claim 10, wherein the contact member is biased to return automatically to the first position when the bladder is deflated.

15. The adjustable seat of claim 14, wherein the contact member is biased by a spring to return automatically to the first position when the bladder is deflated.

16. The adjustable seat of claim 10, wherein the support member moves with the contact member.

17. The adjustable seat of claim 10, wherein the support member is a support band.

18. The adjustable seat of claim 10, wherein the support member directly contacts the resilient cushion.

19. A pneumatically adjustable seat comprising:
    a seat frame having a seat back frame portion;
    a headrest coupled to the seat back frame portion, the headrest including a resilient cushion; and
    a drive assembly pivotally coupled to the seat back frame portion, the drive assembly including
       a contact member operatively associated with the resilient cushion,
       a first bladder operatively coupled to the contact member and in fluid communication with a source of pressurized fluid, wherein inflation of the first bladder via the source of pressurized fluid moves the contact member from a first position to a second position along a first direction, and
       a second bladder operatively coupled to the drive assembly and in fluid communication with a source of pressurized fluid, wherein inflation of the second bladder via the source of pressurized fluid moves the contact member about a pivot axis from a third position to a fourth position; wherein the contact member is movable along the first direction with respect to the pivot axis.

20. The adjustable seat of claim 19, wherein the contact member is biased to return automatically to the first position when the first bladder is deflated.

21. The adjustable seat of claim 20, wherein the contact member is biased by a spring to return automatically to the first position when the first bladder is deflated.

22. The adjustable seat of claim 19, further comprising a support member disposed between an interior surface of the headrest and the bladder, wherein the support member is configured to resist movement of an interior surface of the headrest toward the bladder in a second direction transverse to the first direction.

23. The adjustable seat of claim 19, wherein the support member moves with the contact member.

24. The adjustable seat of claim 19, wherein the contact member is further from the pivot axis in the second position than in the first position.

25. The adjustable seat of claim 19, wherein the pivot axis is orthogonal to the first direction.

26. A pneumatically adjustable seat comprising:
   a seat frame having a seat cushion frame portion;
   a cushion extension portion coupled to the seat cushion frame portion, the cushion extension portion including a resilient cushion; and
   a drive assembly pivotally coupled to the seat cushion frame portion, the drive assembly including
      a contact member operatively associated with the resilient cushion,
      a first bladder operatively coupled to the contact member and in fluid communication with a source of pressurized fluid, wherein inflation of the first bladder via the source of pressurized fluid moves the contact member from a first position to a second position along a first direction,
      a second bladder operatively coupled to the drive assembly and in fluid communication with a source of pressurized fluid, wherein inflation of the second bladder via the source of pressurized fluid moves the contact member about a pivot axis from a third position to a fourth position; wherein the contact member is movable along the first direction with respect to the pivot axis, and
      a support member disposed between an interior surface of the cushion extension portion and the first bladder, wherein the support member is configured to resist movement of the interior surface of the cushion extension portion toward the first bladder in a second direction transverse to the first direction.

27. The adjustable seat of claim 26, wherein the contact member is biased to return automatically to the first position when the first bladder is deflated.

28. The adjustable seat of claim 27, wherein the contact member is biased by a spring to return automatically to the first position when the first bladder is deflated.

29. The adjustable seat of claim 26, wherein the support member moves with the contact member.

30. The adjustable seat of claim 26, wherein the contact member is further from the pivot axis in the second position than in the first position.

31. The adjustable seat of claim 26, wherein the pivot axis is orthogonal to the first direction.

\* \* \* \* \*